US012755230B2

(12) United States Patent
Nair et al.

(10) Patent No.: US 12,755,230 B2
(45) Date of Patent: Oct. 6, 2026

(54) AUTOMATED COMPUTER MODELING OF PALLET COSTS IN A STORAGE FACILITY AND PRESENTATION THEREOF IN GRAPHICAL USER INTERFACES

(71) Applicant: LINEAGE LOGISTICS, LLC, Irvine, CA (US)

(72) Inventors: Remya Nair, Bozeman, MT (US); Nadia Bolis, Berkeley, CA (US); Alexander James Woolf, San Francisco, CA (US); Peter Edward Greskoff, Solana Beach, CA (US); Daniel Thomas Wintz, San Francisco, CA (US)

(73) Assignee: Lineage Logistics, LLC, Irvine, CA (US)

( * ) Notice: Subject to any disclaimer, the term of this patent is extended or adjusted under 35 U.S.C. 154(b) by 67 days.

(21) Appl. No.: 18/613,878

(22) Filed: Mar. 22, 2024

(65) Prior Publication Data

US 2025/0299137 A1    Sep. 25, 2025

(51) Int. Cl.
*G06Q 10/0637* (2023.01)
*G06Q 10/087* (2023.01)

(52) U.S. Cl.
CPC ....... *G06Q 10/0637* (2013.01); *G06Q 10/087* (2013.01)

(58) Field of Classification Search
None
See application file for complete search history.

(56) References Cited

U.S. PATENT DOCUMENTS 6,901,768 B1 * 6/2005 Windecker ............ F25D 17/045 62/239
10,323,878 B1 * 6/2019 Woolf .................. G05B 13/042
(Continued)

FOREIGN PATENT DOCUMENTS

CN 116187910 A * 5/2023 ........... G06Q 10/087
KR 20230062939 A * 5/2023 ....... G06Q 10/08345

OTHER PUBLICATIONS

Deng, "An Improved Distribution Cost Model Considering Various Temperatures and Random Demands: A Case Study of Harbin Cold-Chain Logistics," IEEE Access, 2021, vol. 9, p. 105521-105531. (Year: 2021).*
(Continued)

*Primary Examiner* — Mehmet Yesildag
*Assistant Examiner* — Michael Borowski
(74) *Attorney, Agent, or Firm* — Barnes & Thornburg LLP

(57) ABSTRACT

Disclosed are techniques for modeling costs per pallet in a facility. A computer system can: receive, from a warehouse management system (WMS) and/or a refrigeration control system (RCS), time series data for a period of time for pallets in a facility, retrieve, from a data store, pallet movement data, changes in temperature data, labor usage data, and energy consumption data for each pallet amongst the pallets, determine costs per pallet over the period of time based on correlating the time series data with the retrieved data for each pallet amongst the pallets, the costs per pallet including at least one of energy costs per pallet or labor costs per pallet, determine projected costs per pallet based on modeling the costs per pallet over the period of time, the projected costs being determined for future time periods, and generate output indicating the projected costs per pallet for the future time periods.

18 Claims, 13 Drawing Sheets

(56) References Cited

U.S. PATENT DOCUMENTS

| | | | |
|---|---|---|---|
| 2018/0196456 | A1 | 7/2018 | Elbsat |
| 2018/0197253 | A1 | 7/2018 | Elbsat et al. |
| 2018/0224814 | A1 | 8/2018 | Elbsat et al. |
| 2018/0254632 | A1 | 9/2018 | Elbsat et al. |
| 2018/0357577 | A1 | 12/2018 | Elbsat et al. |
| 2019/0206000 | A1 | 7/2019 | Elbsat et al. |
| 2020/0073342 | A1 | 3/2020 | Lee et al. |

OTHER PUBLICATIONS

Palmer et al., "A Pallet Costing System for Wood Pallet Manufacturers: Version 1.0 for Windows®", USDA Forest Service General Technical Report NE-293, Apr. 2022, 19 pages.

Fishbowl, "Automate Your Warehouse Inventory", webpage accessed at https://try.fishbowlinventory.com/warehouse-management-system/?utm_source=google&utm_term=inventory%20and%20warehouse%20management%20software&utm_campaign=G-Search-Warehouse&utm_adgroup=&utm_medium=cpc&gad_source=1&gclid=Cj0KCQjw3ZayBhDRARIsAPWzx8qEp16IZDe1EeUGS-_tRWFL2HZyHFI_K6m3q6RrS28pev2DB9RIgUcaAsmNEALw_wcB on May 17, 2024, 5 pages.

* cited by examiner

AUTOMATED COMPUTER MODELING OF PALLET COSTS IN A STORAGE FACILITY AND PRESENTATION THEREOF IN GRAPHICAL USER INTERFACES

TECHNICAL FIELD

This document describes devices, systems, and methods related to computer modeling and computer-based techniques for determining and projecting costs, such as energy costs and/or labor costs, attributed to various resources, such as pallets, in a facility.

BACKGROUND

A storage facility, such as a warehouse, can receive thousands of pallets a day, during various times of the day and in various conditions. The received pallets may be stored in the facility and/or frozen while in the facility. These types of facility activities can consume varying amounts of labor and/or energy resources and may also cause increased costs (e.g., energy, labor, monetary, operational, etc.) to the facility.

The received pallets may be stored in different locations throughout the facility, and can require different resources (e.g., labor) to route the pallets to their designated storage locations. Routing of the pallets can consume different amounts of energy, based on a variety of factors, such as distance to route a pallet in the storage facility, type of resource used to route the pallet, availability of resources to route the pallet, and more. The resources can include, but are not limited to, forklifts, human workers operating vehicles such as forklifts, autonomous vehicles, conveyor systems, and human workers. Sometimes, energy usage of the storage facility can increase based on efficiency of routing pallets in the storage facility and use of the available resources. The efficiency to route the pallets can vary based on congestion of resources along travel paths between the different locations throughout the storage facility and/or availability of resources in the storage facility (e.g., human workers taking vacation or sick time when large volumes of pallets arrive at the storage facility).

Energy usage of the storage facility may also fluctuate based on changes in temperature inside the storage facility, which can be impacted by temperature of inbound pallets, ambient air temperature outside the storage facility, temperature of rooms in the storage facility, and/or operation of cooling systems in the facility to maintain desired temperatures and/or freeze pallets to other temperatures. Different pallets may have different temperature requirements for storage in the facility, which can vary based on product type of the pallet, pallet packaging, corresponding customer information, etc. Cooling systems, such as fans and refrigeration units, can be activated to cause changes in temperature in storage locations according to the pallets' temperature requirements.

SUMMARY

The document generally describes technology for determining and projecting (e.g., estimating) pallet costs (and other operational costs) in a facility, such as a warehouse or other storage facility, in order to optimize efficiencies in the facility, reduce waste, reduce carbon footprint, and improve the facility's profit margin. For example, pallet costs and other facility operational costs can be determined and projected using a variety of data about the storage facility, resources in the storage facility, and inbound pallets of items, all of which may be received from disparate data sources. The received data can be homogenized and then processed, with modeling techniques, to determine current costs (e.g., labor costs, energy costs, monetary costs, time costs, operational costs, facility/equipment maintenance costs, non-facility-worker costs) of the storage facility and project future costs of that facility. Such costs can be on a pallet level. In some implementations, these costs can be determined on a customer level and/or a total level for the facility. For example, the disclosed technology can leverage pallet level energy costs to compare performance between high volumes of product times and low volumes of product times. The pallet level energy costs can also be used to compare performance between different-sized facilities. As another example, the disclosed technology can leverage customer level energy costs (e.g., profitability) to determine how each customer's rates and respective operations translate costs that the facilities incur back to the customer. As yet another example, the disclosed technology can leverage total level energy costs to analyze and determine total costs and profitability of the respective facility.

Various techniques can be employed to analyze and process robust datasets from disparate data sources and generate predictions or projected costs and optimizations for facilities. Such techniques can include but are not limited to quantitative statistical analyses, panel/time-series econometrics, machine learning/artificial intelligence methods (e.g., supervised machine learning, unsupervised machine learning), analytical and numerical models (e.g., agent-based, Monte Carlo simulations), causal inference and program evaluation methods (e.g., randomized controlled trials, experiments), game theory, and/or tournament theory. Accordingly, the disclosed techniques can allow for data-driven demand forecasting, pricing, capital allocation, and overall facility optimization.

Sometimes, the disclosed technology can also be used to provide additional facility optimizations. For example, the disclosed technology can be used to generate energy usage schedules for the facility based on the projected future energy costs. The disclosed technology can be used as part of scheduling energy usage in a way that satisfies resource constraints of the facility (e.g., cost or price of the energy usage, availability of human workers and warehouse vehicles for performing operations in the storage facility, availability of refrigeration control systems in the storage facility). The disclosed technology may also be used to improve labor and/or energy resource waste management in the facility. Output from the disclosed technology can be presented in GUI dashboards at computing devices of relevant users, such as managers and other workers in the storage facility. A relevant user can provide user input at their computing device to interact with graphical elements in the GUI dashboards and modify and/or generate energy usage schedules or other optimizations that can be performed in the facility.

The disclosed technology can provide for identifying waste, calculating cost of storing pallets in the facility, and understanding operations efficiency. Factors that contribute to the cost of storing pallets in the facility, e.g. labor, energy, building maintenance etc., can be identified and/or modeled to determine one or more sources of waste in the facility. Both cost and waste can effect the bottomline and can be accounted for in building a pricing model. The pricing model can be a complex web of interaction between cost, availability, customer loyalty, competition, and other factors. These factors may range from location-dependent variations and questions of delivery timing to logistical and labor influences.

Profitability of the facility can also be determined based on virtue of human workers working with stored goods (where the workers place goods in the facility, and whether these decisions are made optimally) as well as shift work conditions. Consider for example, cold conditions in the facility. Because workers may have to endure cold and challenging conditions (e.g., disincentives), they may be under constant pressure to make decisions quickly. This can be a known circumstance where behavioral decision-making heuristics and biases can arise and thus can be inefficient and costly to the overall facility. The disincentives of challenging (e.g. cold) conditions make it plausible that shortcuts are taken when pallets need to be transported to certain parts in the facility for storage, or when multiple pallets need to be moved into a specific unit (e.g. blast freezing unit/blast cell). While it may be most energy-efficient to close the door after each move, time pressure and the cold might lead to human workers leaving the door open for prolonged time periods, which can be costly and inefficient. Relatedly, due to these challenging conditions, increased overtime or unpopular shifts may prompt workers to quit their job, adding to inefficiencies via turnover costs. Any of these inefficiencies can be determined and/or modeled using the disclosed technology.

As described herein, the disclosed technology can provide numerous ways to make facilities more profitable, sustainable, and cooperative along one or more different dimensions. The disclosed technology can be leveraged to propose facility changes for implementation, which can be automatically implemented or implemented at discretion of relevant stakeholders in an affected dimension (e.g., sales, operations and labor, energy, transportation, network teams). As an illustrative example, a sales team may receive relevant information regarding labor availability, space availability, and energy rates for a facility, which can be used to make data-driven decisions about rates they offer to customers for specific times of year. The sales team can negotiate prices and/or drive a change in customer behavior. Case-picking, for example, can be a highly labor intensive job, which can be modeled using the disclosed technology to estimate overall cost to a facility. The estimated overall cost can be used to align a price of storing case-picking pallets with a cost of storing/retrieving such pallets, especially for customers having complex orders with large numbers of items per order. In turn, a separate cost for order lines may also be added to the equation so that customers may not be undercharged and customer behavior can be driven to reduce order complexity and/or labor costs. As a result, critical unknowns in capital deployments, greenfields, and/or expansions may be de-risked.

Using the disclosed technology, warehouse operations, inbound/outbound truck orders, refrigerated facility space, customer relationships, and other dimensions of the facility may be interconnected to maximize overall efficiency throughout the facility. Maximizing overall efficiency can be achieved by: identifying waste in facility operations to reduce costs (e.g., inefficient processes in a dock area, inefficient labor management), determining how facility efficiencies are influenced by ecological factors to increase overall efficiencies, calculating current profit margins to maximize profit, calculating energy waste to reduce a carbon footprint, incentivizing customers to utilize opportunities provided by the facility to improve customer relationships, and modeling cashflows of greenfields and expansions to optimize capital deployment. Furthermore, the disclosed technology can provide recommendations for aligning incentives in facility operations based on short term and long term facility dynamics. Econometric models can be created for current facility operations. A metric can be developed to encapsulate profitability. Price elasticity can be determined based on customer loyalty, market rates, and/or competition. Moreover cost-based pricing and customer incentives can be determined based on one or more different types of costs that may be estimated for the facility.

One or more embodiments described herein can include a system for modeling costs per pallet in a facility, the system including: a computer system that can be configured to: receive, from at least one of a warehouse management system (WMS) or a refrigeration control system (RCS), time series data for a period of time for pallets in a facility, retrieve, from a data store, pallet movement data, changes in temperature data, labor usage data, and energy consumption data for each pallet amongst the pallets, determine a group of costs per pallet over the period of time based on correlating the time series data with the retrieved data for each pallet amongst the pallets, the group of costs per pallet including at least one of energy costs per pallet or labor costs per pallet, determine a group of projected costs per pallet based on modeling the group of costs per pallet over the period of time, the group of projected costs per pallet being determined for one or more future periods of time, generate output to be presented in a graphical user interface (GUI) display at a user device indicating the group of projected costs per pallet for the one or more future periods of time, and return the output for presentation at the user device.

In some implementations, the embodiments described herein can optionally include one or more of the following features. For example, the computer system can also identify a group of facilities that may satisfy one or more grouping criteria, retrieve, from the data store, projected costs per pallet for each of the identified group of facilities, generate a comparison of the retrieved projected costs per pallet for the group of facilities, and return the comparison for presentation at the user device, the comparison including a visual depiction for benchmarking the group of facilities based on their respective projected costs per pallet. The time series data can include first temperature data for a dock area in the facility indicating a temperature of the dock area before a set of pallets arrived at the dock area and second temperature data for the dock area indicating a temperature of the dock area after the set of pallets arrived.

The computer system can also: determine a change in temperature for the dock area based on the first and second temperature data, determine an energy cost for the set of pallets based on the change in temperature for the dock area, the energy cost for the set of pallets indicating a quantitative metric of an amount of energy resources used to adjust a temperature for the dock area from (i) the temperature after the set of pallets arrived to (ii) the temperature before the set of pallets arrived, and apportion the energy cost to each pallet in the set of pallets based on one or more apportionment criteria. The one or more apportionment criteria can be based on at least one of a size of the pallet, a weight of the pallet, an internal temperature of the pallet, a required storage temperature for the pallet, or a type of items on the pallet. The computer system can also determine a labor cost associated with transporting the pallets in the set of pallets and apportion the labor cost to each pallet in the set of pallets based on the one or more apportionment criteria. The computer system may determine, for one or more future periods of time, the group of projected costs per pallet in the set of pallets based on the apportioned energy cost and the apportioned labor cost.

In some implementations, the time series data can include at least one of: truck arrival data for the period of time, truck departure data for the period of time, storage location data for the period of time, customer order data for the period of time, pallet data for the period of time, labor availability data for the period of time, facility resources availability data for the period of time, or energy usage data for the period of time. Sometimes, the time series data may include at least one of: facility temperature data for the period of time, temperature set point data for the period of time, solenoid state data for the period of time, or blast cell state data for the period of time.

The computer system can also receive, from the user device, user input indicating selection of a particular contract or customer of the facility for which to determine costs per pallet, retrieve, from at least one of the WMS or the RCS, the time series data having a relationship with the user-selected contract or customer of the facility, determine the group of costs per pallet based on the retrieved time series data having the relationship with the user-selected contract or customer of the facility, determine the group of projected costs per pallet based on the determined group of costs per pallet for the user-selected contract or customer of the facility, and return the determined group of costs per pallet or the determined group of projected costs for the user-selected contract or customer of the facility for presentation at the user device. The group of projected costs per pallet for the one or more future periods of time can be presented in a timetable in the GUI display, each box in the timetable may correspond to one of the group of projected costs per pallet for one of the future periods of time and further based on one of a group of storage durations.

The computer system can also determine, based on the group of projected costs per pallet, a profit margin for the facility over the period of time, and return the profit margin for the facility for presentation at the user device. The computer system may determine, based on the group of projected costs per pallet, one or more operational inefficiencies for the facility over the period of time, and return the one or more operational inefficiencies for the facility for presentation at the user device. The computer system can determine, based on the group of projected costs per pallet, waste for the facility over the period of time, and return the waste for the facility for presentation at the user device. The computer system can also determine, based on the group of projected costs per pallet, pallet pricing schedules for the facility over the period of time and return at least a portion of the pallet pricing schedules for the facility for presentation at the user device.

One or more embodiments described herein include a method for modeling costs per pallet in a facility, the method including: receiving, by a computer system and from at least one of a warehouse management system (WMS) or a refrigeration control system (RCS), time series data for a period of time for pallets in a facility, retrieving, by the computer system and from a data store, pallet movement data, changes in temperature data, labor usage data, and energy consumption data for each pallet amongst the pallets, determining, by the computer system, a group of costs per pallet over the period of time based on correlating the time series data with the retrieved data for each pallet amongst the pallets, the group of costs per pallet including at least one of energy costs per pallet or labor costs per pallet, determining, by the computer system, a group of projected costs per pallet based on modeling the group of costs per pallet over the period of time, the group of projected costs per pallet being determined for one or more future periods of time, generating, by the computer system, output to be presented in a graphical user interface (GUI) display at a user device indicating the group of projected costs per pallet for the one or more future periods of time, and returning, by the computer system, the output for presentation at the user device.

The method can optionally include one or more of the abovementioned features and/or one or more of the following features. For example, the method can include determining, by the computer system and based on the group of projected costs per pallet, pallet pricing schedules for the facility over the period of time, and returning, by the computer system, at least a portion of the pallet pricing schedules for the facility for presentation at the user device. The method can also include identifying, by the computer system, a group of facilities that satisfy one or more grouping criteria, retrieving, by the computer system and from the data store, projected costs per pallet for each of the identified group of facilities, generating, by the computer system, a comparison of the retrieved projected costs per pallet for the group of facilities, and returning, by the computer system, the comparison for presentation at the user device, the comparison including a visual depiction for benchmarking the group of facilities based on their respective projected costs per pallet. Sometimes, the time series data can include first temperature data for a dock area in the facility indicating a temperature of the dock area before a set of pallets arrived at the dock area and second temperature data for the dock area indicating a temperature of the dock area after the set of pallets arrived. The method may also include determining, by the computer system, a change in temperature for the dock area based on the first and second temperature data, determining, by the computer system, an energy cost for the set of pallets based on the change in temperature for the dock area, the energy cost for the set of pallets indicating a quantitative metric of an amount of energy resources used to adjust a temperature for the dock area from (i) the temperature after the set of pallets arrived to (ii) the temperature before the set of pallets arrived, and apportioning, by the computer system, the energy cost to each pallet in the set of pallets based on one or more apportionment criteria. The method may include determining, by the computer system, a labor cost associated with transporting the pallets in the set of pallets, and apportioning, by the computer system, the labor cost to each pallet in the set of pallets based on the one or more apportionment criteria.

The devices, system, and techniques described herein may provide one or more of the following advantages. For example, the disclosed technology can be used to project energy costs, labor costs, and other types of costs on a pallet level for a storage facility. Costs per pallet can be leveraged to improve overall operations, energy usage, and labor usage in the facility. The pallet level costs can provide a degree of granularity that allows for calculating profit margin for storing and moving pallets in the facility. Calculating energy cost per pallet can provide relevant information about spent energy in the facility, which can be used to further improve and optimize operations at the facility. From an energy perspective, not every pallet is qual. Each pallet can have products or items of varying temperatures (e.g., some products can already be frozen and thus would not require latent heat to be removed whereas some products may already be warm and thus would require freezing operations). Additionally, the way a product is packaged can also impact how efficiently the product can be frozen or cooled. An amount of energy required to freeze the product can also depend on the product type itself (e.g., strawberry jam versus mechanically-separated chicken versus whole chicken cutlets). Any variety of these factors can be analyzed using the disclosed techniques to determine spent energy in the facility and ways to improve and optimize facility operations.

Calculating energy cost per pallet can also provide for generating a distribution curve of energy spent to store a pallet, which can further be used to analyze how the distribution varies across facilities, across different products, and/or between frozen and non-frozen products. The energy distribution curve can be used to analyze energy cost distribution across pallets in a facility to better achieve and determine a profit margin on the pallet level. Similarly, the energy distribution curve across pallets and/or products can be used to map out different types of products and determine which types of products can be targeted for future contracting at the facilities. The energy distribution curve can also be used to more accurately determine pricing of different types of products (e.g., if a particular product type enters the facility slightly war, such as above a desired freezing temperature, then the customer can be charged a higher price since the product would require additional energy/time to cool to the desired freezing temperature).

The energy distribution curve across facilities may also be used to determine health of refrigeration and other cooling equipment being used in the facilities, which can provide for improved and proactive maintenance of the equipment. As a result, shortages, issues, or other failures in the equipment can be avoided and the facilities can continue to operate according to operational schedules. The facilities may also experience reduced downtime in operations if and when an issue arises, which can result in the facilities continuing to operate efficiently and on schedule. As another example, the disclosed technology provides for receiving large amounts of data from seemingly disparate data sources and homogenizing the data for use in robust and accurate energy usage and cost determinations for specific storage facilities. The data can be homogenized regardless of underlying schemas. The homogenized data can therefore provide improved and more robust, granular insight into costs incurred by the storage facility, how costs are projected to trend for the storage facility, and how costs can be improved over time to improve resource (e.g., labor, energy) waste management at the storage facility.

The disclosed technology also provides user-friendly and interactive GUI dashboards for use by relevant stakeholders of the storage facility. A relevant user can interact with the GUI dashboards to input information specific to the storage facility and/or other factors that may include energy and/or labor costs for the storage facility. Using the user input, the disclosed technology can generate recommended actions to optimize energy and/or labor resources in the facility, which can be presented in the GUI dashboards. For example, the relevant user can look up energy costs and how particular actions/activities in the storage facility impact the energy costs over different times of the year and/or under different conditions (e.g., weather conditions, availability of labor conditions). The relevant user can make informed decisions about how to modify and/or change current operations of the storage facility to reduce costs (e.g., financial, labor, energy), thereby improving efficiency and operations of the facility. Labor insights can also be added to the user's decisions to derive data-driven recommendations for modifying and/or changing schedules (e.g., energy usage schedules) of the facility.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document generally relates to technology for determining costs associated with serving and/or storing pallets in a storage facility, determining a profit margin for the facility, determining a pallet pricing schedule, and/or determining ways in which operations in the facility can be optimized or otherwise improved. The disclosed technology can provide for determining energy costs, labor costs, and other types of costs on a pallet level in the facility. Outcomes from performing the disclosed techniques can be implemented in the facility to reduce costs, improve efficiency and operations therein, and improve waste management in the facility.

The storage facility can be a warehouse, cold storage facility, distribution center, or other type of facility that processes inbound and outbound items, including but not limited to pallets having goods, products, items, and/or cases of items. The disclosed technology can provide for correlating and analyzing data from various different sources about the facility, inbound pallets, customers, energy market, etc., where the data is first homogenized. Machine learning techniques, such as machine learning models that have been trained to model pallet costs for the storage facility, based on the homogenized data, can also be used to determine the profit margin for the facility and ways in which to improve efficiencies and operations and reduce waste in the facility. The outcomes from performing the disclosed techniques can be presented to relevant users in GUI dashboards at respective computing devices, and used by the relevant users to optimize or adjust operations, energy usage, and other resource usage in the storage facility. Using the disclosed technology, the facility can reduce costs (e.g., labor, energy, financial, and other resources).

Figure 1A:
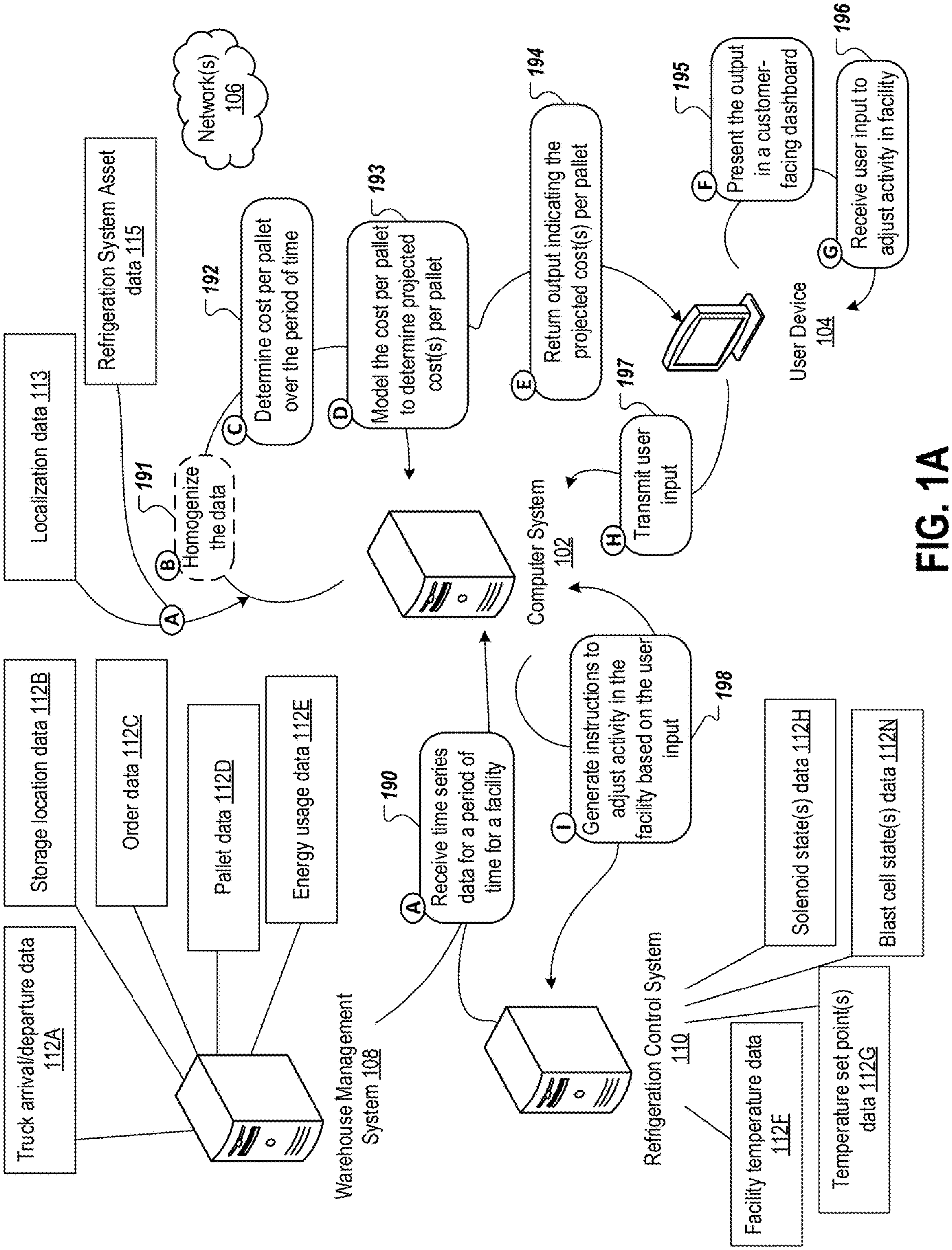
FIGS. 1A, 1B, and 1C are conceptual diagrams for determining costs on a pallet level in a storage facility.
Figure 1B:
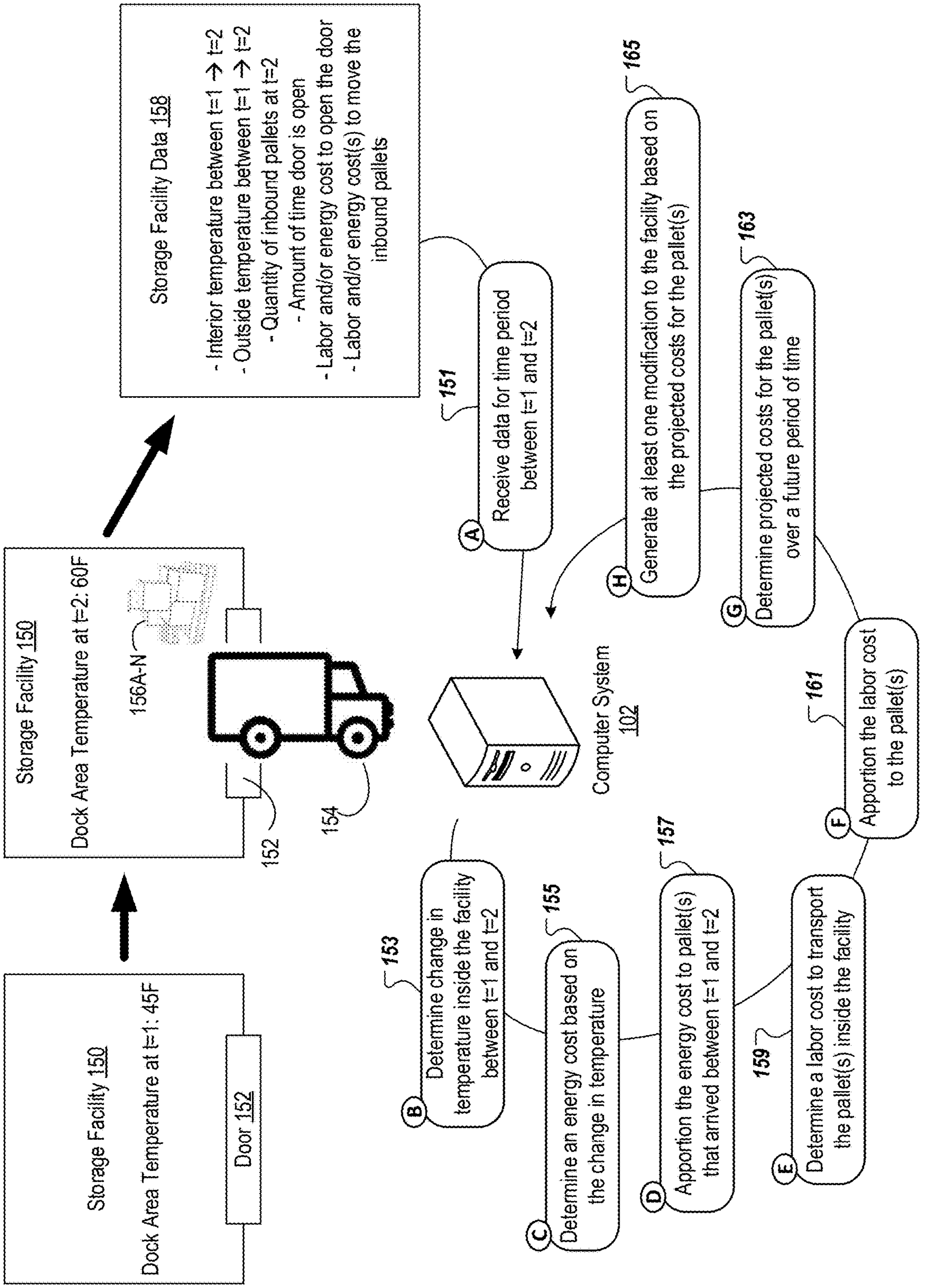
Figure 1C:
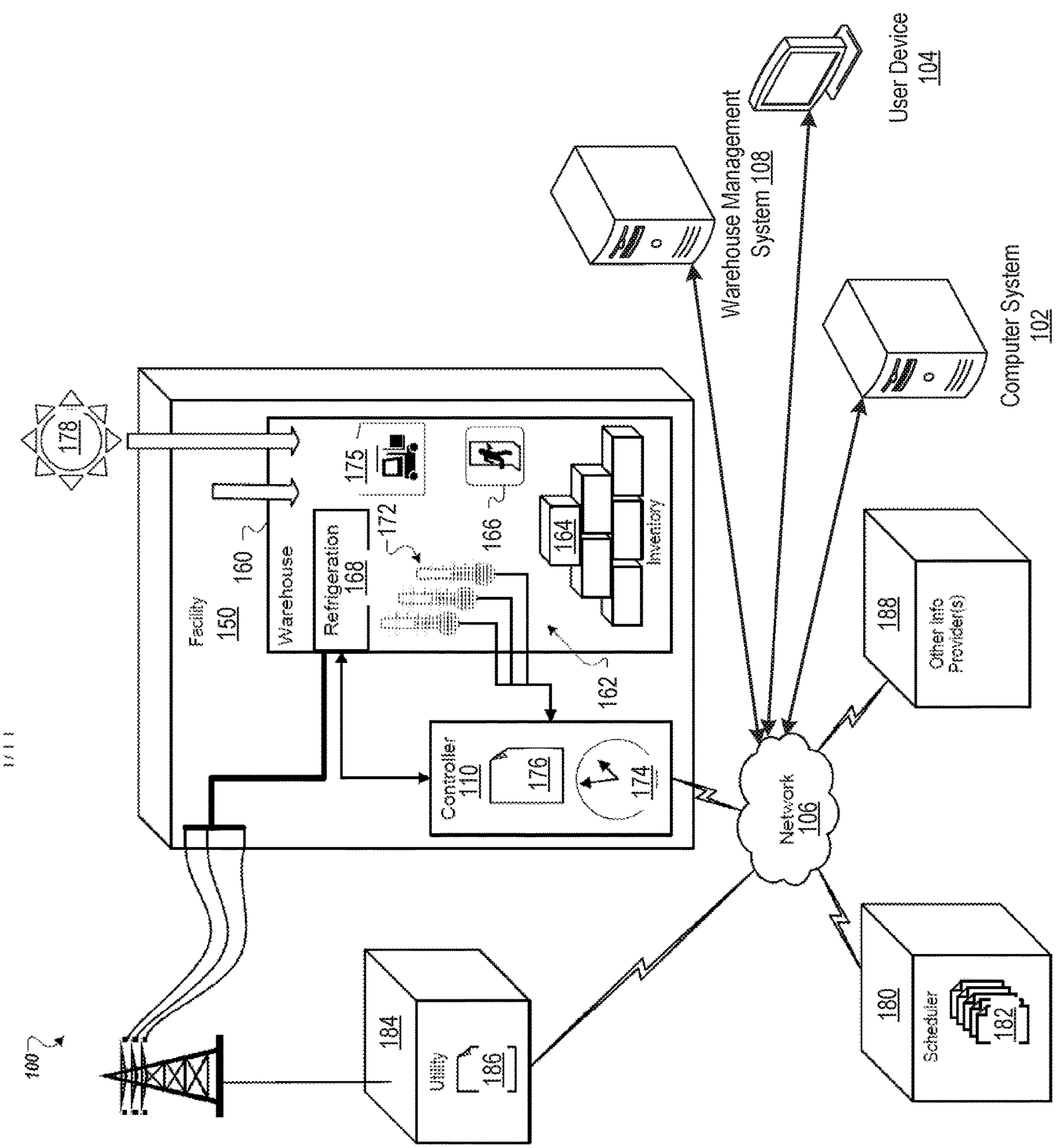

Referring to the figures, FIGS. 1A, 1B, and 1C are conceptual diagrams for determining costs on a pallet level in a storage facility, such as storage facility 150 in FIG. 1B. In FIG. 1A, a computer system 102, user device 104, warehouse management system (WMS) 108, and refrigeration control system (RCS) 110 can communicate (e.g., wired and/or wireless) via network(s) 106. Sometimes, one or more of the components 102, 104, 108, and 110 may be part of a same computing system. As an example, the computer system 102 and the WMS 108 can be part of the same computing system. As another example, the computer system 102, the WMS 108, and the RCS 110 can be part of the same system.

One or more of the components 102, 104, 108, and 110 may additionally or alternatively be physically located in a storage facility, such as the storage facility 150 in FIG. 1B, or physically remote from the storage facility (e.g., refer to FIG. 1C). As an example, the computer system 102 can be a cloud-based computing system that is remote from the storage facility. The computer system 102 can also perform operations, such as determining estimated pallet costs, for multiple different storage facilities. As another example, the WMS 108 and/or the RCS 110 can be part of or otherwise physically located at a particular storage facility. The WMS 108 and the RCS 110 can be configured to perform operations for the particular storage facility, while another WMS and another RCS can perform operations for another storage facility. In some implementations, the particular storage facility can have multiple refrigeration control systems 110, where each RCS can control a different cold storage room, a different set of cold storage rooms, and/or a different area or region within the storage facility.

The computer system 102 can be any type of computing system, cloud-based system, network of computing devices, and/or network of computing systems that is configured to process data associated with a storage facility and determine pallet costs for the storage facility. The computer system 102 can, for example, determine costs (e.g., labor, financial, energy, other resources) associated with a pallet in the storage facility over a period of time, such as between a time that an inbound pallet is unloaded from a truck in a dock area of the storage facility to a time that the inbound pallet is moved to a designated storage location in the storage facility. The computer system 102 can correlate movement data and other data about the inbound pallet as it moves through the storage facility with energy consumption data for the storage facility over the period of time in order to apportion energy usage in the storage facility to the particular inbound pallet. By apportioning activities, actions, resource consumption data, and/or energy consumption data to the particular inbound pallet, the computer system 102 can then project future pallet costs associated with other pallets that may be the same as, similar to, or even different than the particular inbound pallet.

The user device 104 can be any type of computing system and/or computing device having input and output devices and can include but are not limited to mobile phones, smartphones, tablets, laptops, and/or wearable devices. The user device 104 can include a display for presenting information to a relevant user of the device 104. A user-facing dashboard can be presented in a GUI at the display that allows the user to interact with pallet cost information for the particular storage facility. For example, the projected/estimated future pallet costs on a pallet level can be outputted in a table or other schedule in the GUI dashboard. The user can view information about when pallet costs are expected to increase or decrease over some future period of time. Presenting this information to the relevant user can assist the user to make informed decisions about optimizing energy and/or labor usage for the storage facility. Refer to FIGS. 4A, 4B, 4C, and 4D for further discussion about the GUI dashboard.

The WMS 108 can be any type of computing system, cloud-based system, network of computing devices, and/or network of computing systems that is configured to maintain, manage, and/or process data and/or information about or otherwise associated with the storage facility. The WMS 108 can also generate instructions to control one or more components and/or operations in the storage facility.

The RCS 110 can be any type of computing system, cloud-based system, network of computing devices, and/or network of computing systems that is configured to control operation of one or more refrigeration systems and/or assets of the refrigeration system(s).

Still referring to FIG. 1A, the computer system 102 can receive time series data for a period of time for the storage facility (block A, 190). The data can be received from the WMS 108 and/or the RCS 110. The time series data can include timestamps indicating times at which activities, events, actions, or other information identified in the data occurred during the period of time. The period of time can be any predetermined period of time, including but not limited to 1 hour, 5 hours, 12 hours, 1 day, 2 days, 3 days, 5 days, 7 days, 2 weeks, 4 weeks, 2 months, etc. The received data can include, from the WMS 108, one or more of truck arrival/departure data 112A, storage location data 112B, order data 112C, pallet data 112D, and energy usage data 112E. The received data can additionally or alternatively include, from the RCS 110, facility temperature data 112F, temperature set point(s) data 112G, solenoid state(s) data 112H, and/or blast cell state(s) data 112N. Additionally or alternatively, the computer system 102 can receive localization data 113 and/or refrigeration system asset data 115 from one or more other sources. The other source(s) can include any external computing systems/devices in communication with the computer system 102 via the network(s) 106 and/or data stores, data repositories, data lakes, or other types of databases. In brief, the localization data 113 can include a map of the storage facility with annotations indicating the facility's various storage locations, dock areas, and other regions/zones. The refrigeration system asset data 115 can include information about one or more assets that are used or otherwise part of a refrigeration system in the facility, such as fans, solenoids, sensors (e.g., temperature, humidity), and controllers. The information can indicate, for example, how each asset operates and/or how much energy each asset consumes during operation.

Figure 5:
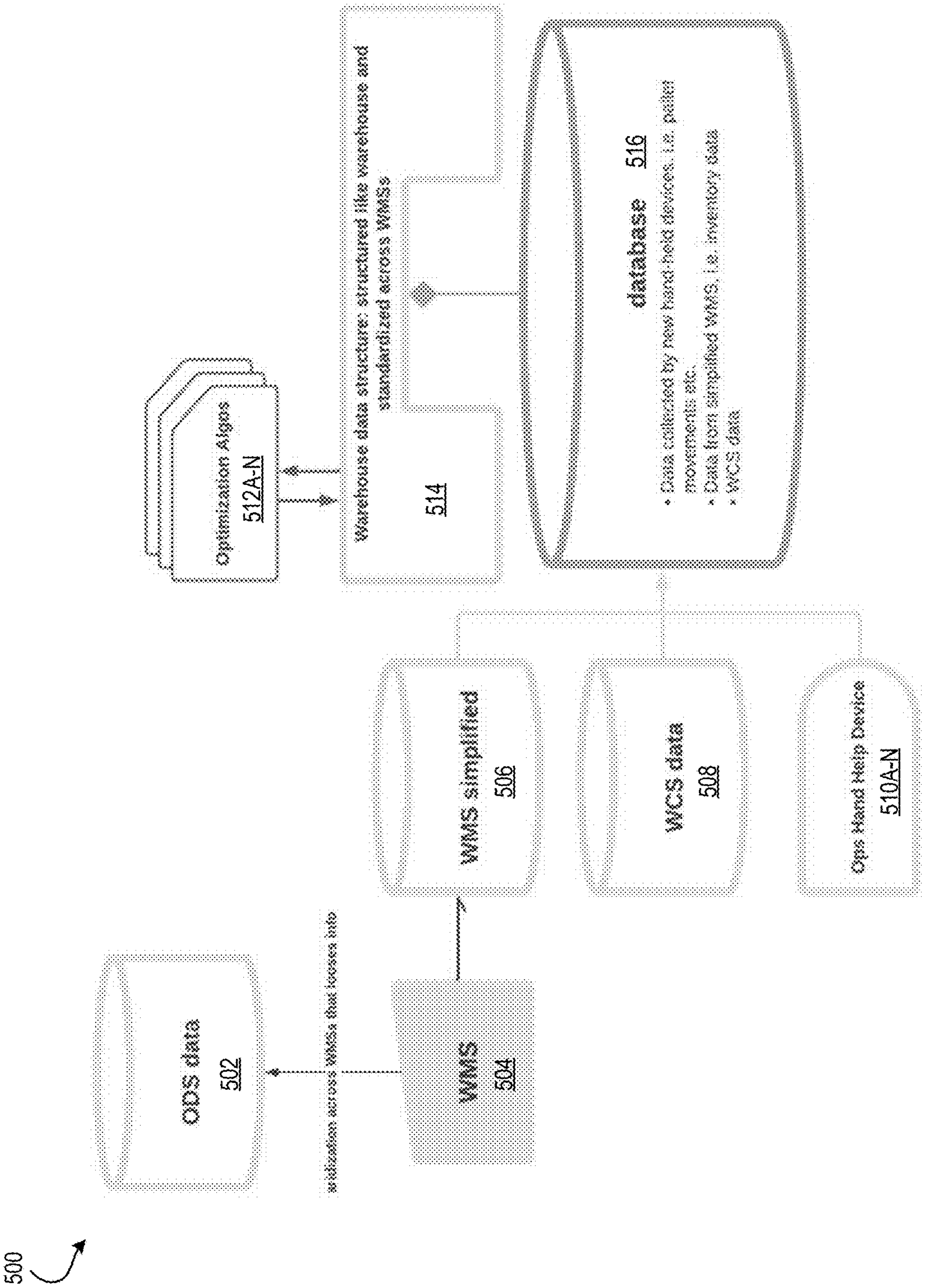
FIG. 5 is an example system diagram of components that can be used to perform one or more of the techniques described herein, such as homogenizing data.
Figure 6:
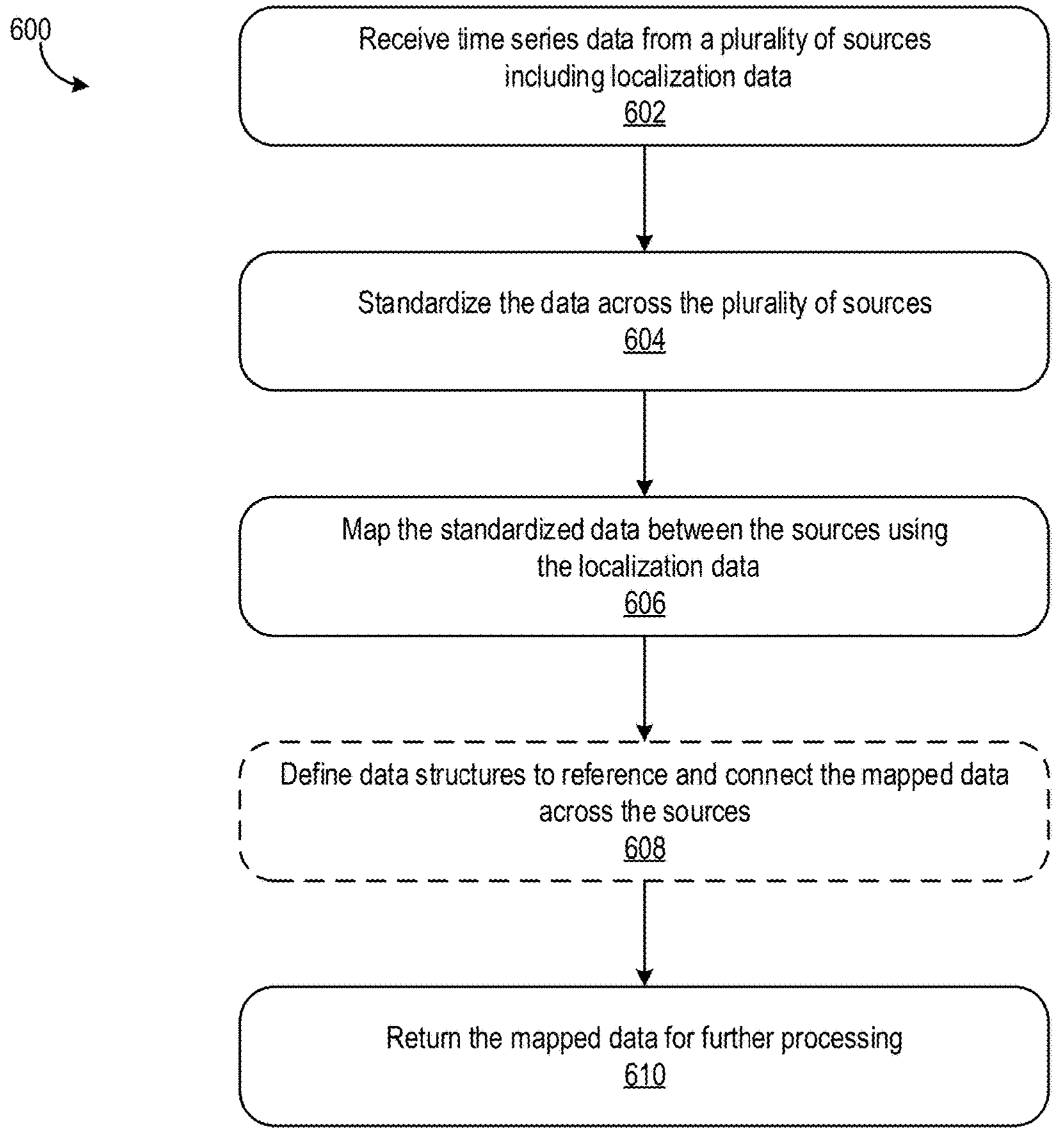
FIG. 6 is a flowchart of a process for homogenizing data from different sources to be used in the disclosed techniques.

Once the computer system 102 receives one or more of the data 112A-N, 113, and/or 115 in block A (190), the computer system 102 can optionally homogenize the data in block B (191). Refer to FIGS. 5-6 for further discussion about homogenizing the data. As described herein, although the data comes from seemingly disparate data sources that may have different structures and mappings for storing and maintaining the data, the data can be homogenized at the computer system 102, regardless of underlying schema, so that the data can be used to generate accurate determinations about energy usage and energy costs for the storage facility.

The computer system 102 determines a cost per pallet over the period of time in block C (192), using the homogenized data. The period of time can be, for example, 1 day. The computer system 102 can identify events in the homogenized data having similar and/or same timestamps. The computer system 102 may correlate and associate the data with a particular pallet that was received at the storage facility, for example, at or within some threshold amount of time of the timestamps. Once the data is correlated with the pallet, the computer system 102 can implement one or more rules, algorithms, and/or machine learning-trained models to perform a calculation of the cost per pallet. One or more different costs can be determined, including but not limited to energy costs, labor costs, operational costs, building costs, equipment maintenance costs, non-facility-employee costs, other types of costs, and/or any combination thereof.

As an illustrative example of determining pallet level energy costs, pallet A can arrive at the storage facility at time t=1 during a previous day. The pallet A can be processed at the storage facility at time t=2, which can include identifying information about the pallet A (e.g., pallet data 112D). The information can indicate, for example, that the pallet A has a temperature of 70 F. The computer system 102 may also receive the facility temperature data 112F indicating that at time t=1, the facility had a temperature (e.g., or a temperature in a docking area where trucks deliver pallets) of 45 F, and at time t=3, the facility had a temperature of 47.5 F. Because the timestamps are within threshold amounts of time of the pallet A arriving at the storage facility, the computer system 102 can correlate the increase in temperature inside the storage facility to the arrival of the pallet A inside the storage facility. Moreover, the computer system 102 can receive temperature set point(s) data 112G at time t=4 indicating that control instructions were generated and executed to cause one or more fans in the docking area where the pallet A was delivered to actuate and thus circulate the warmed air out of the docking area. The computer system 102 can also correlate this data with the pallet A. Furthermore, the computer system 102 can receive energy usage data 112E for the previous day and identify a spike in energy usage at the storage facility between times t=2 and t=5. Since the spike in energy usage was within a threshold amount of time of at least the pallet A's arrival at the storage facility, the computer system 102 can associate the spike in energy usage with the pallet A.

In the above example, applying one or more rules, algorithms, or models, the computer system 102 can analyze the correlated data for the particular pallet to determine an energy cost for the pallet over the previous day. The energy cost can correspond to how much energy was consumed to move the pallet A from the truck to a storage location in the storage facility, what labor resources (e.g., human workers, forklifts, warehouse vehicles, autonomous vehicles) were used to move the pallet A in the storage facility, how much energy was consumed by the refrigeration system in the storage facility to cool an area in the storage facility where the pallet A's temperature affected an ambient temperature in the area, how much time was spent moving the pallet A in the storage facility, how much time was spent to cool the area in the storage facility to a predetermined set point temperature, how much it cost (monetary) to move the pallet A in the storage facility, and/or how much it cost (monetary) to power the refrigeration system to cool the area. The energy cost can additionally or alternatively indicate a quantitative metric (e.g., monetary) of an amount of energy resources used to adjust a temperature of the area affected by the pallet A's temperature to a predetermined temperature set point for that area.

The computer system 102 can determine the cost for the pallet for each day during a threshold period of time. The computer system 102 can also determine the cost for the pallet, and other pallets, over one or more other periods of time. In some implementations, the computer system 102 can use a machine learning trained model to determine the cost per pallet over the threshold period of time.

In block D (193), the computer system 102 can model the cost per pallet to determine projected cost(s) per pallet. The computer system 102 can forecast costs based on historical utility rates and a cost of freezing and/or storing products or items contained in the pallets. The forecasting can be performed for specific kinds of products, rather than for individual pallets. For example, energy costs can be forecasted for whole chicken, a pallet of fruits, a pallet of ice cream, etc. Sometimes, the computer system 102 can also transform such forecasted costs to a per pallet cost, if, for example, the whole pallet contains just one product. The computer system 102 can additionally or alternatively perform intelligent projection of costs for same products. For example, once the computer system 102 determines energy cost of whole chicken, the determined energy cost can be used, in combination with at least forecasted utility rates, to forecast energy cost of freezing and/or storing whole chicken products in the facility.

Furthermore, the forecasting can be done based on one or more sub-categories, which may include type of product, packaging, etc. The forecasting can also be different based on whether the products are to be frozen (e.g., blast frozen) or not. Products that are not intended to be frozen usually can enter a facility at a desired storing temperature, which means the products may already be cold and/or frozen upon arrival. As a result, these products may not contribute a significant amount to a heat load of the facility. On the other hand, products intended to be frozen usually enter the facility warm, which has a greater image on the overall heat load of the facility.

For example, the computer system 102 can apply a model to the cost per pallet over the period of time that was determined in block C (192). The model can be trained to predict or determine future costs for the pallet over one or more future periods of time. The future periods of time can include, for example, a next day, a next couple days, a next week, a next 2 weeks, a next month, a next 2 months, etc. Sometimes, the user can provide user input at the user device 104 indicating a user-desired future period of time for determining projected costs for the pallet. In implementations where the cost for the pallet over the past period of time is determined as output from a backward-looking model, this model output can be provided as input to the model in block D (193) (which can be a forward-looking model). Therefore, the model can generate output indicating a cost of the pallet based on past costs associated with the pallet. The model can also receive one or more additional or other inputs, such as any of the data 112A-N, 113, and 115 described above. For example, the model can receive inputs about upcoming or current weather conditions, traffic conditions, other seasonal information, inflation, or other factors that may influence energy prices in an energy market and/or efficiency or operations in the storage facility. Any of these additional inputs can also be provided to the model to accurately determine projected costs for the pallet. Sometimes, the costs for the pallet can be determined using one or more rules and/or algorithms, instead of or in addition to machine learning models.

As an illustrative example, in block D (193), the computer system 102 can determine that pallets that arrive during midday and afternoons in summer months have a higher energy cost (historically, or over some past period of time) than pallets that arrive in the early morning or evenings during the summer months. After all, when the pallets arrive at midday during peak heat, doors of the storage facility are opened and may let in warm environmental area, thereby increasing an ambient temperature inside the storage facility. Since more heated air is added to the storage facility, more power/energy is needed to suck the air out of the storage facility and thus remove the added heat from the storage facility. The higher energy cost during midday and afternoons in the summer months can also be attributed to increased energy prices in the market for a specific year (which can be based on inflation or other factors affecting the market), increased demand for energy during midday and the afternoons in the summer months, decreased energy supply during the summer months, weather patterns/storms for that specific year and/or summer months, and any other data or information that may be received by the computer system 102 for performing the calculation in block D (193).

In block E (194), the computer system 102 returns output indicating the projected (e.g., estimated) cost(s) per pallet. The output can be transmitted to the user device 104. The output can include a time table, schedule, or other visual depiction of costs per pallet at various future times (e.g., hourly times, daily times, weekly times, monthly times). The outputted costs can be user selectable such that the user at the user device 104 can select a pallet cost for implementing one or more changes to operations and/or schedules in the facility.

The user device 104 can present the output in a customer-facing or other relevant user-facing dashboard (block F, 195). Refer to FIGS. 4A, 4B, 4C, and 4D for further discussion about the dashboard. The user device can also receive user input to adjust activity in the storage facility in block G (196). For example, the user can select an option presented in the dashboard to use energy during one of the future times. The user can also provide input indicating one or more changes to a labor schedule (e.g., how many human workers should work a shift when inbound pallets are arriving), amount of warehouse vehicles available during one of the future times, time at and/or order by which certain pallet movement activities are performed during one of the future times, or other activities in the storage facility. Sometimes, the computer system 102 can present one or more recommendations for adjusting activities in the storage facility based on the outputted costs per pallet. The user can select any of the recommendations to be implemented. Accordingly, an indication of the user input can be transmitted back to the computer system 102 (block H, 197).

The computer system 102 can generate instructions to adjust the activity in the facility based on the user input (block I, 198). The computer system 102 can automatically control one or more components in the storage facility to make the adjustments. The computer system 102 can transmit the instructions to the RCS 110 for execution. For example, the user can select a lowest energy cost presented in the dashboard. Based on this selection, the computer system 102 can generate instructions that cause the RCS 110 to activate one or more fans at a particular time that corresponds to the user-selected lowest energy cost. At the particular time, the RCS 110 can then automatically activate the one or more fans and operate until a condition is satisfied (e.g., a cold storage room is cooled to a desired temperature, an amount of time that the energy is available or being provided to the RCS 110 expires).

As an illustrative example, the user can select a lowest energy cost presented, where the lowest energy cost corresponds to moving the pallet(s) out of the storage facility between 2 AM-5 AM on a following day (block G, 196). Selection of this energy cost can cause the computer system 102 to automatically update operations in the storage facility so that energy will be consumed at approximately the user-selected lowest energy cost between 2 AM-5 AM on the following day (block I, 198). In some implementations, the computer system 102 can generate instructions to bill the storage facility) at approximately the user-selected lowest energy cost (and can automatically bill the storage facility before, during, and/or after the energy is consumed between 2 AM-5 AM on the following day). The computer system 102 can also generate and transmit instructions to a utility provider indicating that the storage facility will be consuming/requiring energy between 2 AM-5 AM on the following day at approximately the user-selected lowest energy cost. The user-selected lowest energy cost can be adjusted even after selected by the user based on factors including but not limited to whether the storage facility actually consumed a projected amount of energy that was used by the computer system 102 to determine the projected energy cost for the pallet between 2 AM-5 AM on the following day, whether the storage facility consumed more or less than the projected amount of energy, unexpected changes in the energy market, unexpected changes in labor or other available resources at the storage facility, unexpected weather conditions, and/or one or more other factors. Moreover, as mentioned above, the computer system 102 can generate and transmit instructions to the RCS 110 instructing the RCS 110 to activate/control one or more refrigeration system assets between 2 AM-5 AM on the following day. One or more other adjustments to activities in the storage facility can also be made using the disclosed techniques.

FIG. 1B is an example use case of the techniques described throughout this disclosure. Although FIG. 1B is described in the context of determining energy costs and labor costs and apportioning such costs to one or more pallets, the techniques described herein can additionally or alternatively include determining one or more different types of costs. Moreover, the costs and/or apportionment of costs can vary based on a pallet level, such as based on pallet product type(s), pallet packaging information, and/or pallet weight. The example of FIG. 1B is intended to be merely illustrative, and may be applicable to some product types on pallets but may or may not be used for all product types. Sometimes, the techniques described in FIG. 1B can be adjusted based on the product type, the pallet packaging information, or other pallet or facility information.

In the illustrative example of FIG. 1B, the storage facility 150 has a dock area temperature of 45° F. at time t=1. At this time, a door 152 (or multiple doors) near or in the dock area remains closed. This is because, for example, at t=1, a truck or trucks have not yet arrived to drop off or pick up items at the storage facility 150.

Some time after time t=1, at t=2, the door 152 is opened and a truck 154 drops off pallets 156A-N in the dock area of the storage facility 150. At t=2, the temperature inside the dock area can be measured (e.g., by temperature sensors positioned throughout the dock area, such as near and/or around the door 152) as 60° F. The temperature inside the dock area can be continuously measured between times t=1 and t=2. Sometimes, the temperature can be measured at predetermined time intervals, such as every 1 minute, every 5 minutes, every 10 minutes, etc. At t=2, the temperature is 15° higher than at t=1 because, in this example, the pallets 156A-N can be warmer than the dock area and thus cause the dock area temperature to rise when the pallets 156A-N are placed therein. Additionally or alternatively, the temperature can be higher at t=2 than at t=1 because an ambient temperature outside of the storage facility 150 can be higher than the dock area temperature. When the door 152 is open, the ambient temperature from outside of the storage facility 150 can enter the facility, thereby warming up the temperature in the dock area.

At t=2, the temperature in the dock area can rise beyond a threshold temperature that the dock area should be kept at.

As a result, warm air in the dock area may be removed or sucked out (e.g., with fans or other components of the refrigeration system described herein) of the dock area, which consumes energy and thereby increases energy costs for the storage facility 150. Similarly, when the truck 154 arrives, the door 152 must be controlled (e.g., automatically and/or manually) to open and close, both of which also consume energy and therefore increase energy costs. All the energy costs described above, in association with loading and unloading the pallets 156A-N in the dock area, opening and closing the door 152, and removing warm air from the dock area, are apportioned to each of the pallets 156A-N using the disclosed techniques. The apportioned energy costs may further be used to determine projected energy costs of each of the pallets 156A-N and/or the storage facility 150 as a whole, which can help the computer system 102 and/or relevant stakeholders of the storage facility 150 determine modifications to make the storage facility 150 operate more efficiently.

Still referring to FIG. 1B, storage facility data 158 can be generated for the storage facility 150 before, during, and after times t=1 and t=2. The storage facility data 158 can be generated by various systems and devices, such as sensors positioned throughout the storage facility 150 (e.g., temperature sensors, motion sensors, humidity sensors), image capturing devices, warehouse management systems, and/or user devices (e.g., a worker in the dock area can analyze the pallets 156A-N and record some information about each of the pallets 156A-N, a supplier of the pallets 156A-N can provide information about each of the pallets 156A-N to the storage facility 150 WMS, each of the pallets 156A-N can be automatically profiled by an automated pallet profiling system upon arrival in the dock area to determine information about the pallets 156A-N).

The storage facility data 158 can include, but is not limited to, an interior temperature of the storage facility 150 (e.g., the dock area temperature, multiple different temperatures in various locations inside the storage facility 150) at times t=1, t=2, and/or between t=1 and t=2, ambient temperatures outside the storage facility at times t=1, t=2, and/or between t=1 and t=2, a quantity of inbound pallets at any time such as t=2, an amount of time that the door 152 is open, labor and/or energy cost(s) associated with opening the door 152, labor and/or energy cost(s) associated with closing the door 152, and/or labor and/or energy cost(s) associated with moving the inbound pallets 156A-N. The interior temperature of the storage facility 150 can be captured by one or more temperature sensors positioned throughout the storage facility 150, such as near the door 152, near a pallet unload area in the dock area, etc. The ambient temperatures outside the storage facility 150 can be captured by one or more temperature sensors positioned outside the storage facility 150, such as near the door 152. The ambient temperatures outside the storage facility 150 can also be determined by one or more other devices and/or retrieved from a weather system or another computing system that is remote from the storage facility 150. A quantity of inbound pallets can be determined automatically by the computer system 102, based on processing image data of the inbound pallets 156A-N to determine a count of the pallets 156A-N. The quantity can also be provided by the supplier of the pallets 156A-N and/or a truck driver to the computer system 102 and/or the WMS of the storage facility 150. The quantity can also be determined by the worker in the dock area and provided as input at the worker's user device, which can then be transmitted to the storage facility 150's WMS and/or the computer system 102. The amount of time that the door 152 is open can be determined based on processing, by the computer system 102, image data that includes the door 152 to determine a timestamp at which the door 152 appears to be opening and a timestamp at which the door 152 appears to be closing/closed. The labor and/or energy cost(s) associated with opening and/or closing the door 152 and/or moving the pallets 156A-N can be determined based on a variety of information, including but not limited to sensor data collected in the storage facility 150, historic costs, quantity of workers, quantity of warehouse vehicles used, etc. The storage facility data 158 is intended to be a non-limiting example of types of data that may be processed by the computer system 102 to determine and apportion energy costs to the pallets 156A-N. Other data may additionally or alternatively be used to perform the disclosed techniques.

Still referring to FIG. 1B, the computer system 102 receives the storage facility data 158 for a time period between t=1 and t=2 (block A, 151). The computer system 102 can also continuously receive the data 158 before, during, and after the time period.

Based on the data, the computer system 102 can determine a change in temperature inside the storage facility 150 between t=1 and t=2 (block B, 153).

Using the disclosed techniques, the computer system 102 can determine an energy cost based on and associated with the change in temperature (block C, 155). The energy cost can be determined using schedules of energy costs and/or amount of energy to be consumed to adjust the temperature inside the storage facility 150 to a desired temperature or threshold temperature range for the storage facility 150 (or the particular dock area or other location in the facility for which the temperature change was determined).

The computer system 102 can also apportion the energy cost to the pallets 156A-N that arrived between t=1 and t=2 (block D, 157). Sometimes, the energy cost can be apportioned equally to each of the pallets 156A-N. Sometimes, the energy cost can be apportioned differently to each of the pallets 156A-N, which can be based on energy cost apportionment criteria. As an illustrative example, a heavier pallet can require more labor and/or energy resources to move throughout the storage facility 150 than a lighter pallet. The heavier pallet can be apportioned more of the energy cost than the lighter pallet. For the same product type, a more massive pallet may need more energy to freeze than a lighter pallet. Usually, however, a facility may only put full pallets in a blast freezer or other temperature-controlled environment, which means that both pallets would way the same and the energy cost per pallet would typically be the same for the same product type. As another example, a pallet that has an internal temperature that is significantly warmer than another pallet can be apportioned more of the energy cost (after all, the pallet with the warmer internal temperature contributes more to the rise in temperature inside the storage facility 150 than the other pallet). For products that are not intended to be frozen in the facility, they enter the facility at their designated storage temperatures and thus would not add a significant amount of heat load to the facility. Therefore, these products may be apportioned less of the energy cost of the facility than products that enter the facility with the intention of being frozen (e.g., blast frozen).

The energy cost and/or heat load of a pallet can be apportioned to the pallet based on one or more criteria. The one or more criteria can include, but are not limited to, an actual product on the pallet (e.g., whole chicken, mechanically-operated chicken, strawberries, barrels of strawberry pulp, etc.), packaging of the product on the pallet, spacers used during a freezing process for products that are intended to be frozen in the facility, a temperature at which the products arrive at the facility, and/or a temperature at which the product needs to be stored in the facility (e.g., ice cream). The one or more criteria can additionally or alternatively include factors specific to components of the facility, such as health of a refrigeration system in the facility and/or efficiencies (or inefficiencies) with which the refrigeration system is operated/run.

The computer system 102 may determine a labor cost to transport each of the pallets 156A-N inside the storage facility 150 (block E, 159). The labor cost can include quantity of workers needed, type and/or quantity of warehouse vehicles needed, amount of time to transport the pallet from one location to another in the facility, distance traveled to transport the pallet, amount of time the pallet would remain in the dock area, amount of time the pallet would remain in a particular storage location, etc. The labor cost can be determined based on analysis, by the computer system 102, of historic pallet data for same, similar, or other pallets and/or historic data associate with the supplier/customer of the pallet. The labor cost can be determined on an individual pallet basis and/or as a whole for all of the pallets 156A-N that arrived between t=1 and t=2. The labor cost may be determined using machine learning techniques, such as machine learning-trained models.

The computer system 102 apportions the labor cost to each of the pallets 156A-N (block F, 161). The labor cost can be similarly apportioned as described above in reference to apportioning the energy cost in block D (157). Sometimes, the labor costs can be determined and apportioned at a same time as or before determining and/or apportioning the energy costs in blocks C and D (155 and 157 respectively).

In block G (163), the computer system 102 determines projected costs for the pallets 156A-N (e.g., each individual pallet, the pallets as a whole) over a future period of time. Refer to block D (193) in FIG. 1A and description below for further discussion.

The computer system 102 may also generate at least one modification (or suggestion for modification(s)) to the storage facility 150 based on the projected costs for the pallets 156A-N (block H, 165). The modification can include, for example, a schedule of energy costs indicating at what times of day and/or days during the week the projected energy costs may be lower and thus opportune times to bring in pallets, unload the pallets in the dock area, and/or transport the pallets around the facility 150. The modification can include, for example, suggestions for changing times and/or days of pallet deliveries based on outside ambient temperature, availability of workers and/or warehouse vehicles, expected deliveries of high-energy-consuming pallets, seasonal demand, seasonal supply, and/or various other factors. As described throughout this disclosure, the at least one modification can be provided to one or more relevant stakeholders of the storage facility 150 in a GUI display at their respective computing devices. The stakeholders can view the modification(s) and choose whether to implement the modification(s) (e.g., automatically and/or manually) and/or provide different modifications to be made to the storage facility 150. The modification(s) described herein can be implemented (e.g., automatically by the computer system 102 and/or other computing systems and devices or manually by users) in order to improve and optimize energy usage and overall efficiency in the storage facility 150.

In some implementations, portions of the techniques described in FIG. 1B can be performed and/or driven in part based on a granularity of data available. One or more portions of the disclosed techniques can also vary and/or be performed based on product type, pallet type information, pallet packaging information, data being available versus unavailable, data translations being available versus unavailable, etc.

FIG. 1C is a schematic diagram that shows an example refrigeration management system 100. The storage facility 150 (e.g., refrigeration facility, cold storage facility) includes a warehouse 160, which is an insulated cold storage enclosure that defines a substantially enclosed space 162. The enclosed space 162 has various content, including an inventory 164 (e.g., pallets, items), a collection of equipment 175 (e.g., forklifts, storage racks), and air. The inventory 164, the equipment 175, and the air within the enclosed space 162 has a thermal mass, as does the material of the warehouse 160 itself (e.g., steel supports, aluminum walls, concrete floors).

The enclosed space 162 is cooled by a refrigeration system 168 that is controlled by the controller 110 based on temperature feedback signals from a collection of sensors 172 (e.g., temperature, humidity, airflow, motion). In some embodiments, the controller 110 can be a cold storage control system controller, and can include a processor, memory, storage, inputs, and outputs. The sensors 172 are distributed throughout the warehouse 160 to enable the controller 110 to monitor environmental conditions throughout the enclosed space 162, and in some embodiments, in and/or near the inventory 164 (e.g., sensors embedded in or between boxes or pallets of stored goods). The controller 110 is configured to activate the refrigeration system 168 based on feedback from the sensors 172 to keep the enclosed space 162 at a temperature below or at a predetermined temperature limit. For example, an operator of the facility 150 can agree to store a customer's frozen foods (e.g., frozen meats, frozen French fries, ice cream) below a maximum of 0° F.

The warehouse 160 is configured to resist heat infiltration. Heat energy that can raise the temperature of the enclosed space 162 and its contents can come from a number of sources. A primary source of heat energy is the sun 178, which can directly warm the structure of the warehouse 160 and warms the ambient environment surrounding the warehouse 160 and the facility 150. Such heat energy can infiltrate the warehouse 160 directly through the walls of the warehouse 160 and/or through the opening of a door 166. Other sources of heat energy can come from the operation of the equipment 175 (e.g., warm engines of forklifts, heat given off by lighting), the body heat of humans working within the enclosed space 162, and the inventory 164 itself (e.g., fresh product may arrive at 20° F. for storage in a 0° F. freezer).

The controller 110 is in data communication with a scheduler 180 by the network 106 (e.g., the Internet, a cellular data network, a private network). In some embodiments, the scheduler 180 can be a cold storage management server computer in communication with the controller 110. In some phases of operation, the controller 110 collects measurements from the sensors 172 and timestamps based on a chronometer 174 (e.g., clock, timer) and provides that information to the scheduler 180. The scheduler 180 uses such information to determine a thermal model of the warehouse 160.

In the example of the system 100, the controller 110 receives an operational schedule 176 from the scheduler 180. In general, the schedule 176 includes information that causes the controller 110 to precool the enclosed space 162 to a temperature below the predetermined temperature limit for the inventory 164, and in some examples, below a hysteresis range for normal operation of the refrigeration system 168, during one or more predetermined periods of time. For example, under nominal operational conditions the controller 110 may be configured to keep the enclosed space below 0° F. by turning the refrigeration system 168 on when a temperature within the warehouse 160 exceeds −1° F., and turns the refrigeration system 168 off when the temperature drops below −2° F. However, the schedule 176 may configure the controller 110 to cool the enclosed space toward −5° F. or some other predetermined temperature during one or more predefined periods of time. These periods of time can proceed periods of time in which the price of power is relatively higher (e.g., peak pricing periods, periods of inherently low system efficiency).

The scheduler 180 can be configured to determine one or more operational schedules 182, of which the operational schedule 176 is one. The scheduler 180 can determine the operational schedules 182 based on thermal models. The scheduler 180 can receive thermal model information about the facility 150, such as timed readings from the sensors 172 and operational information about the refrigeration system 168, to determine a thermal model of the warehouse 160.

The scheduler 180 can also determine the operational schedules 182 based on an energy cost schedule 186 provided by a utility provider 184 that can provide power to the facility 150. The energy cost schedule 186 can include information about the cost of energy at different times and/or different days. For example, the utility provider 184 can be an electric power provider that normally charges $0.12 per kilowatt-hour (kWh), but increases the cost to $0.20 per kilowatt-hour consumed between 10 am-2 pm because demand for electrical power may peak during that time. In another example, the utility provider 184 may charge more during the summer months than during the winter months due to the seasonal demand caused by air conditioners and other cooling systems such as the refrigeration system 168. In general, the energy cost schedule 186 describes one or more future cycles (e.g., daily) where power costs are scheduled to go up and down.

As described herein, the computer system 102, WMS 108, and user device 104 can also communicate over the network 106 with the facility 150, the scheduler 180, and/or the utility provider 184. For example, the computer system 102 can receive temperature data from the sensors 172 in the facility 150, inventory 164 information from the WMS 108, and/or operational schedules 182 from the scheduler 180, all of which may be used by the computer system 102 to determine current and project future costs of each of the inventory 164 and/or other inventory or pallets that enter the facility 150 and/or the warehouse 160. The computer system 102 may also communicate with any of the components in the system 100 described herein to generate one or more suggested modifications to improve and optimize energy consumption for the facility 150.

One or more other information providers 188 are configured to provide other information to the facility 150, the scheduler 180, the utility provider 184, the computer system 102, the WMS 108, and/or the user device 104 over the network 106. For example, the information provider 188 can be a metrological service information server computer that provides daily or hourly weather forecasts. In such an example, the utility provider 184 may use a forecast of hot weather to predict increased demand and attempt to incentivize reduced demand by increasing the cost of power during hot hours, and/or the scheduler 180 may use the forecast to determine operational schedules 182 that pre-chill the warehouse 160 in anticipation of hot weather than increased heat influx. The computer system 102 may also use the forecast to project future energy costs of one or more of the inventory 164 and/or other inbound inventory or pallets at the facility 150. In another example, the utility provider 184 may provide signals for demand response events, and/or the scheduler 180 may use the signals to modify operational schedules 182. In yet another example, the information provider 188 can be a solar or wind energy provider, and can provide a forecast of surplus solar or wind energy (e.g., a particularly sunny or windy day) that would be available to pre-chill the warehouse 160 and/or used by the computer system 102 to determine one or more modifications to energy consumption of the warehouse 160 for a particularly sunny or windy day.

In some embodiments, the information provider 188 can be a production or logistics scheduler. For example, the information provider 188 may provide information to the scheduler 180 that indicates that a high level of activity may be planned for the warehouse 160 between 4 pm and 5 pm tomorrow. Since high levels of activity may include increased output of heat by the equipment 175 and workers, and more frequent or prolonged openings of the door 166 that might alter the thermal model of the warehouse 160. The scheduler 180 may respond by pre-chilling the enclosed space in anticipation of this predicted activity and the predicted influx of heat. The computer system 102 may additionally or alternatively respond by generating a time-energy schedule indicating that energy consumption may be highest during the planned high level of activity and that some activities and/or energy usage should be offset.

In yet another example, the information provider 188 may provide information to the scheduler 180 about the inventory 164. Different types of inventory can have different thermal characteristics. For example, a pallet of ice cream in plastic pails may absorb and release heat energy in different amounts and at different rates than a pallet of cases of onion rings packaged in plastic bags within corrugated cardboard boxes. In some embodiments, the scheduler 180 can use information about the thermal properties the inventory 164 or changes in the inventory 164 to modify the thermal model and modify the operational schedules 182 to account for changes to the thermal model. For example, the scheduler 180 can prescribe a longer precooling period than usual when the inventory 164 includes items having unusually high thermal capacities and/or items that are stored in well-insulated containers. Additionally or alternatively, the computer system 102 can use the information about the inventory 164 from the information provider 188 to determine and/or project energy costs associated with the inventory 164. The computer system 102 can also use the modified operational schedules 182 from the scheduler 180 to determine and/or project energy costs associated with the inventory 164.

Different types of inventory can also enter the warehouse 160 in different states. For example, the information provider 188 may provide information to the scheduler 180 and/or the computer system 102 that indicates that a large inventory of seafood at 10° F. is due to arrive at a 5° F. warehouse at 9 am the next day. The scheduler 180 may modify the operational schedules 182 to offset the effect cooling the seafood from the incoming 10° F. to the warehouse's set point of 5° F. while also anticipating and offsetting the effects of variable energy pricing by prescribing a longer and/or colder period of pre-cooling. The computer system 102 can use the modified operational schedules 182 and/or information from the information provider 188 to determine and/or project energy costs of the large inventory of seafood due to arrive the next day. One or more other examples are also possible.

Figure 2A:
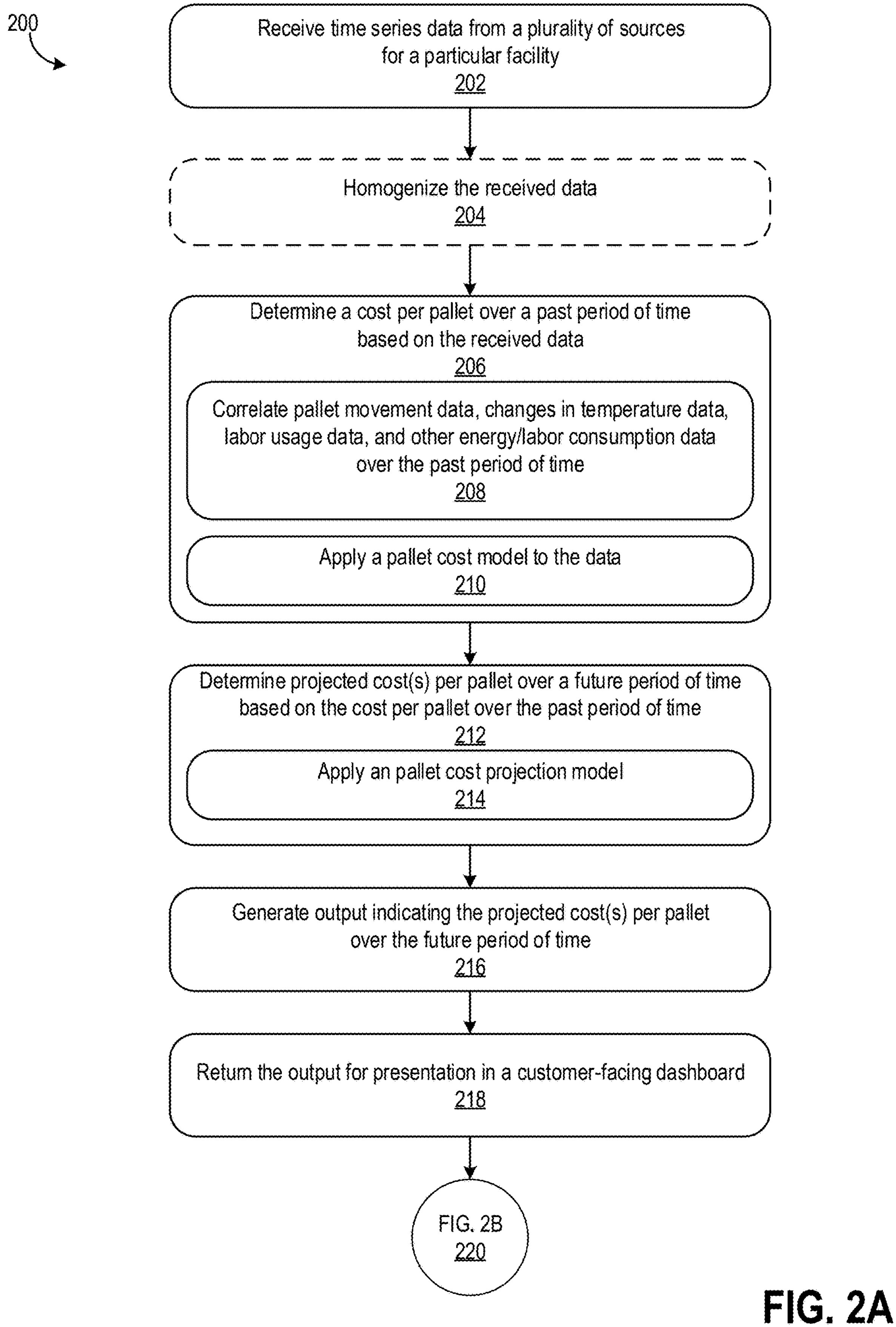
FIGS. 2A and 2B are a flowchart of an example process for determining pallet costs in a storage facility.
Figure 2B:
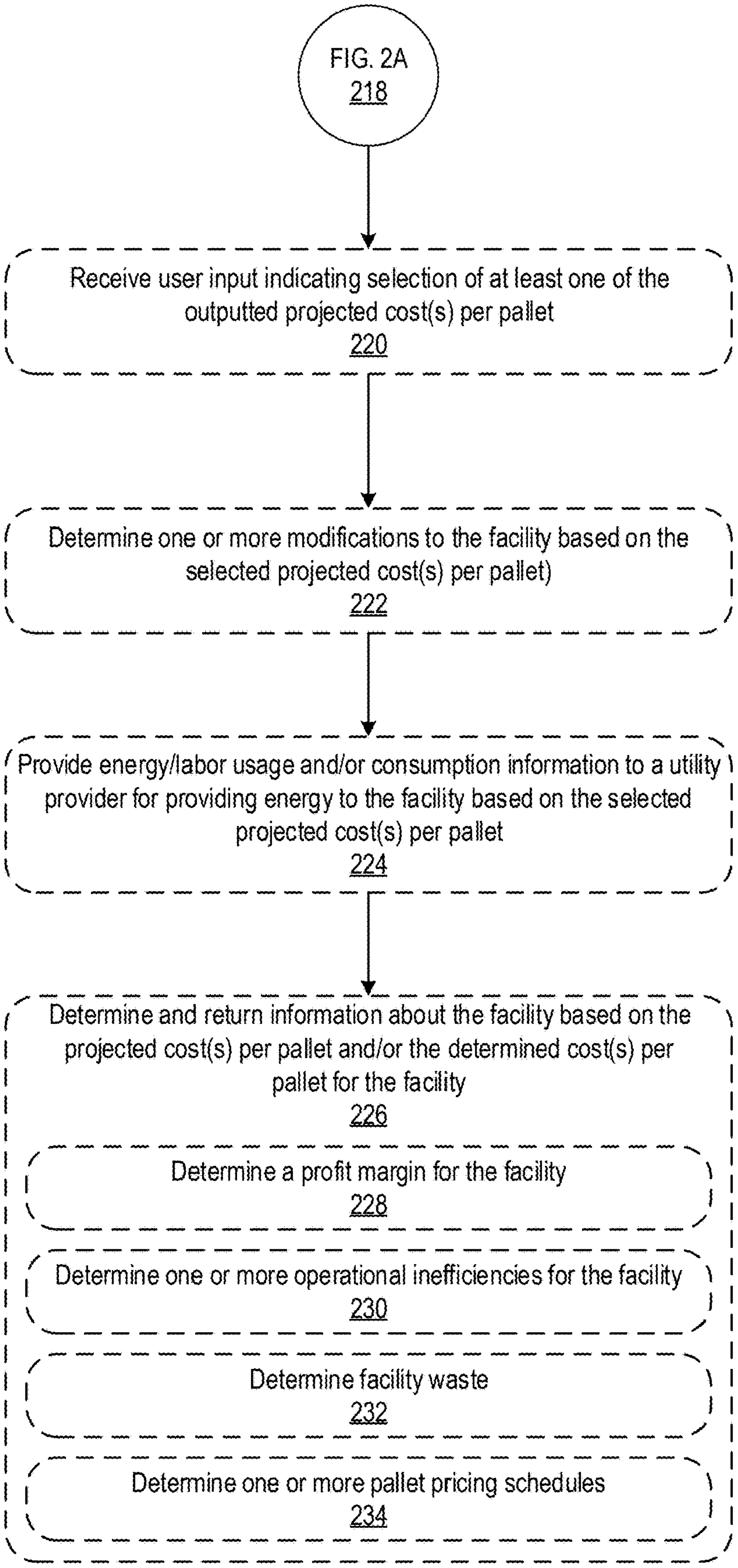

FIGS. 2A and 2B are a flowchart of an example process 200 for determining costs in a storage facility. The process 200 can be performed by the computer system 102. The process 200 can also be performed by one or more other computing systems, devices, computers, networks, cloud-based systems, and/or cloud-based services. For illustrative purposes, the process 200 is described from the perspective of a computer system.

Referring to the process 200 in both FIGS. 2A and 2B, the computer system may receive time series data from a plurality (e.g., group, one or more) of sources for a particular facility (block 202). The data can be any type of data described herein, including but not limited to truck arrival and/or departure data, storage location data, order data, pallet data, energy usage data, localization data, refrigeration system asset data, facility temperature data, temperature set point(s) data, solenoid state(s) data, and/or blast cell state(s) data. Refer to FIG. 1A for further discussion about the data.

Being time series data, the data can be indexed in a time order. The data can be timestamped. The data may also be a sequence of data taken at successive points in time (e.g., equally-spaced points in time and/or different time intervals). The timing aspect of the data can be used by the computer system to associate measured and/or projected energy costs with different points in time when activities occur in the facility, such as the storage facility 150 described above. The timing aspect can also be used to determine times of day at which one or more modifications can be made to the facility to optimize the facility's energy usage (e.g., switching from a morning delivery to a night-time delivery, which is when fewer deliveries arrive at the facility and/or utility pricing for energy is lower).

The computer system can optionally homogenize the received data in block 204. The computer system can translate the received data between time series to a standardized format and then attribute the standardized data to different infrastructures and/or actors in the facility. The computer system is able to process and analyze various different data from various different services and/or actors, where each data can be a different type and/or format. As a result, the computer system can generate more accurate and robust determinations, projections, and/or modifications by tapping into all different types of data that may be associated with the particular facility. Refer to FIGS. 5 and 6 for further discussion.

The computer system can determine a cost per pallet over a past period of time based on the received data in block 206. For example, the computer system can correlate pallet movement data, changes in temperature data, labor usage data, and other energy consumption and/or labor consumption data over the past period of time (block 208). As an illustrative example, the computer system can identify changes in temperature in a particular location in the facility where a particular pallet is located over the past period of time. The computer system can then correlate or attribute that change in temperature (or some portion of the change in temperature) to the particular pallet. After all, the particular pallet may have an internal temperature that is greater than the temperature in the location in the facility, thereby causing the temperature in the location to increase.

As another illustrative example, the computer system can identify how long it took workers to move the particular pallet from a dock area to a storage location in the facility, and energy costs associated with the movement (e.g., distance traveled, route/path taken through the facility, speed at which the workers moved, time the pallet was in transit, type of warehouse vehicle or other equipment used, other tasks the workers could have completed instead, labor energy used to move the pallet, warehouse vehicle energy used to move the pallet, and other efficiencies or inefficiencies associated with moving the pallet), then attribute such costs to the particular pallet.

As yet another example, the computer system can determine overall energy costs incurred at the facility during an inbound shipment of pallets over the past period of time (e.g., the past period of time being a time of delivery, an amount of time between delivery and movement of the pallets to their designated storage locations). The computer system can then apportion the overall energy costs to each of the pallets from that inbound shipment. In some implementations, the computer system can apportion the overall energy costs to one or more other pallets that were not part of the inbound shipment (e.g., pallets that had to be moved or swapped from their storage locations for one or more pallets from the inbound shipment, pallets that were retrieved and brought to a dock area as part of an outbound shipment on the same truck that delivered the pallets from the inbound shipment).

As described above, the determined cost(s) can be apportioned to each pallet using one or more weights, scaling factors, and/or criteria. For example, a heavier pallet can be apportioned more of the determined cost(s) than a lighter pallet because the heavier pallet can require more labor to move in the facility. As another example, a warmer and larger pallet can be apportioned more of the determined cost(s) than a colder, larger pallet or a warmer, smaller pallet because the warmer, larger pallet can contribute more to an increase in temperature in a particular location in the facility. One or more other weights, scaling factors, and/or criteria may also be used to determine how much of the cost(s) to apportion to each pallet.

The computer system can additionally or alternatively apply a pallet cost model to the data to determine the cost per pallet over the past period of time (block 210). The cost model can be a machine learning-trained model. The model can be trained to aggregate data from a variety of sources, determine a total energy, labor, and/or other resources consumed by the facility over the past period of time, and then apportion the total resources consumed to one or more particular pallets. The model can, for example, perform the techniques described in reference to block 208 with light-weight and efficient processing.

The computer system can determine projected cost(s) per pallet over a future period of time based on the cost per pallet over the past period of time (block 212). For example, the computer system can apply a pallet cost projection model in block 214. The model can be a machine learning-trained model. The model can be trained to map the cost per pallet over the past period of time to future energy prices, future energy usages, future inbound and outbound shipments, future labor availability, and/or other future or projected logistics associated with the facility. The model can also be trained to project/predict how the cost per pallet over the past period of time may change over the future period of time. The projection/prediction can be made based on analysis and correlation of historic data (e.g., historic energy consumption, historic energy prices, historic weather data, historic shipment volume data, historic labor data) associated with the facility and/or the pallets (including pallets that were apportioned the cost over the past period of time and other pallets, such as pallets from suppliers who are expected to ship more pallets to the facility over the future period of time).

Sometimes, the computer system can determine projected costs over the future period of time for pallets that are selected or otherwise identified by a relevant stakeholder of the facility. For example, in a GUI at a user device of the stakeholder, the stakeholder can provide user input indicating a particular order of pallets that is expected to arrive at the facility the next day. The computer system can receive this input, determine the cost per pallet in the order over one or more previous periods of time (blocks 206-210) and then project the cost per pallet in the order at a time that the order is expected to arrive the next day. The computer system can also project the cost per pallet in the order for one or more other future times before or after the time that the order is expected to arrive the next day. As a result, the computer system can determine various different costs that the stakeholder can choose from to efficiently use energy/labor without negatively impacting overall efficiency and operations inside the facility. The computer system can also generate, based on the various different costs, one or more suggested modifications to the order delivery schedule and/or other operation schedules in the facility in order to reduce energy consumption and/or optimize labor usage. Refer to FIGS. 4A, 4B, 4C, and 4D for further discussion about the GUIs.

The computer system generates output indicating the projected cost(s) per pallet over the future period of time in block 216. The output can be a table or other schedule indicating the projected cost per pallet at one or more future times. The output can include one or more graphs (e.g., bar graphs, line graphs, pie charts) indicating the projected cost(s) per pallet at one or more future times and/or over the future period of time.

In block 218, the computer system returns the output for presentation in a customer-facing dashboard. The customer-facing dashboard can be outputted in the GUI display at the user device of the relevant stakeholder. The customer-facing dashboard can also be presented at one or more other user devices of other users associated with the facility.

Optionally, the computer system may receive user input indicating selection of at least one of the outputted projected cost(s) per pallet (block 220). For example, the projected cost(s) per pallet can be presented in a table, where each box in the table represents the projected cost per pallet at a particular time. The relevant stakeholder can select a box, thereby indicating that they would like to use the expected amount of energy for the pallet(s) at a particular time associated with the box. By using the expected amount of energy at the particular time, the stakeholder also expects the resulting energy cost to be approximately the energy cost presented in the box. Sometimes, the user selection may already coincide or align with a timing and/or energy cost for the pallet. As a result, no modification may be made to the facility.

On the other hand, sometimes, the user may select a time that does not coincide with an expected delivery time of the pallet(s). This can result in the computer system and/or another system or user making one or more modifications to operation and/or energy usage for the facility (block 222). In other words, the computer system can generate an updated ordering of tasks to be completed at the facility based on the pallet(s) now being delivered at the user-selected time rather than the expected delivery time. This change in the ordering of tasks may also result in the computer system determining one or more other projected costs at the user-selected time for other pallets that would be affected (or likely to be affected) by the delivery of the pallet(s) at the user-selected time.

Optionally, the computer system can provide energy/labor usage and/or consumption information to a utility provider for providing energy to the facility based on the selected projected cost(s) per pallet (block 224). As mentioned above, a time at which energy is used and/or an amount of energy to be consumed at the facility can be adjusted based on the user selection in block 220. Such an adjustment can be transmitted to a computing system of the utility provider so that the utility provider can update a utility schedule for the particular facility. Block 224 can be performed automatically by the computer system in response to receiving the user selection in block 220. Alternatively, block 224 can be performed manually by the stakeholder and/or by the computer system upon receiving additional user input from the stakeholder indicating that they would like the adjustment in energy usage to be transmitted to the utility provider.

Sometimes, the computer system may bill the facility for the energy to be provided by the utility provider, based on the selected projected energy cost(s) per pallet. The computer system may bill the facility once the utility provider makes the adjustment or updates to the utility schedule. Alternatively, the utility provider can bill the facility directly, before, during, and/or after the adjustments or updates are made to the utility schedule for the facility.

Optionally, the computer system can determine and return information about the facility based on the projected cost(s) per pallet and/or the determined cost(s) per pallet for the facility (block 226). For example, the computer system can determine, based on the projected costs per pallet, a profit margin for the facility over one or more periods of times (e.g., a past period, current period, future period) (block 228). The determined profit margin can be returned to the user device for presentation. As another example, the computer system can determine, based on the projected costs per pallet, one or more operational inefficiencies for the facility over the period of time (block 230). As yet another example, the computer system can determine facility waste (block 232). Additionally or alternatively, the computer system can determine one or more pallet pricing schedules (block 234).

Figure 3:
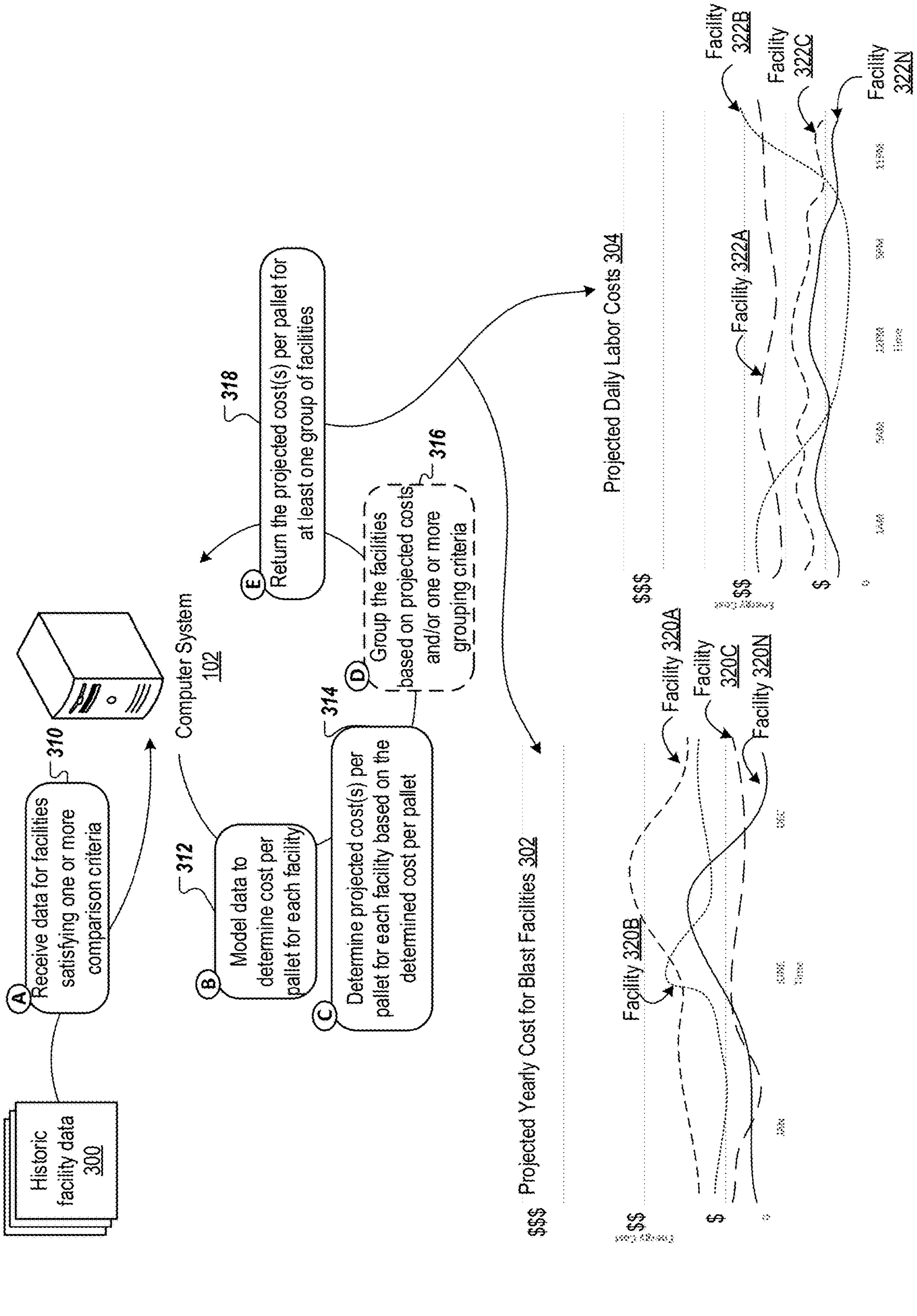
FIG. 3 is a conceptual diagram for determining pallet costs for different example pallets in one or more different storage facilities and comparing such pallet costs on a facility-to-facility level.

FIG. 3 is a conceptual diagram for determining costs for different example pallets in one or more different storage facilities and comparing such pallet costs on a facility-to-facility level. The computer system 102 can receive historic facility data 300 for facilities satisfying one or more comparison criteria in block A (310). The historic facility data can include any of the data described in FIG. 1A for each of the facilities, which have been generated for the facilities over a past period of time (e.g., daily, a last day, a last week, a last month, a last 6 months, a last year).

The one or more comparison criteria can be used to identify and select facilities having similar characteristics/operations. Pallet costs for the identified and selected facilities can be determined and used to compare the facilities to each other. A facility-to-facility comparison can indicate which facilities are more profitable than others and how to improve or optimize operations in one or more of the facilities based on performance and/or profitability of one or more other similar facilities. The one or more comparison criteria can be used to identify and select facilities that have blast freezing operations. The one or more comparison criteria can be used to identify and select facilities that simply store products and do not have blast freezing operations. The one or more comparison criteria can be used to identify and select facilities having one or more predefined levels of refrigeration. The one or more comparison criteria can be used to identify and select facilities that ship products to grocery stores (and therefore have different labor requirements than facilities that ship to other facilities due to more case picking). The one or more comparison criteria can also be used to identify and select facilities based on one or more other characteristics, energy requirements, and/or labor requirements.

The computer system 102 can model the data to determine a cost per pallet for each of the facilities that are identified and selected using the one or more comparison criteria (block B, 312). The cost can be determined per pallet over the past period of time associated with the received data 300. Sometimes, the cost can be determined over another period of time that is part of or includes the past period of time associated with the received data 300. Refer to block C (192) in FIG. 1A for further discussion.

The computer system 102 can then determine projected cost(s) per pallet for each facility based on the determined cost per pallet (block C, 314). The projected cost(s) per pallet can be determined for one or more future periods of time. The future periods of time can include user-defined periods of time (e.g., hourly for a next day or multiple days, weekly for a next month or multiple months, monthly for multiple months or a next year). Refer to block D (193) in FIG. 1A for further discussion.

The computer system 102 may optionally group the facilities based on the respective projected cost(s) and/or one or more grouping criteria (block D, 316). Sometimes, the grouping may be performed in block A (310), when the computer system 102 identifies and selects the facilities that satisfy the one or more comparison criteria. Sometimes, the computer system 102 may not select and identify the facilities in block A (310), and instead may simple retrieve data 300 for a plurality of facilities. Then the computer system 102 can determine costs per facility and group the facilities based on the one or more grouping criteria in block D (316).

In block D (316), facilities can be grouped together based on their projected costs. Facilities having similar costs can be grouped together, then compared amongst each other and/or compared to other groups of facilities having other similar costs. The facilities can be grouped based on profitability (e.g., highest profitability to lowest profitability). The facilities can be grouped based on type of costs (e.g., labor, energy, maintenance, operational). The one or more grouping criteria can be the same as or similar to the one or more comparison criteria, in some implementations.

The computer system 102 returns the projected cost(s) per pallet for at least one group of facilities (block D, 316). The computer system 102 can return visual depictions of the projected costs for facilities in the group. For example, the computer system 102 can return graphs, such as graphs 302 and 304 shown in FIG. 3. The graph 302 depicts projected yearly cost for blast facilities. The graph 304 depicts projected daily labor costs for a group of facilities. The computer system 102 can also generate and return one or more different comparisons and/or visual depictions for one or more other groups of facilities. The graphs 302 and 304 are merely illustrative and are not intended to be limiting.

In the graph 302, facilities 320A-N are facilities that perform blast freezing operations. Since these facilities 320A-N share commonalities (e.g., blast freezing) they have been grouped together (e.g., using the one or more comparison criteria and/or the one or more grouping criteria) and compared in the graph 302 based on their projected yearly costs. Such costs can include energy, labor, and/or other resources that are modeled/determined by the computer system 102. As shown in the illustrative graph 302, some of the facilities 320A-N (e.g., facility 320A and facility 320B) may have higher projected yearly costs than others of the facilities 320A-N. The higher projected yearly costs may in part be due to a quantity of pallets that the facilities 320A and 320B receive that require blast freezing in comparison to the other facilities (which may cause blast cells to be operated for longer periods of time or operated continuously, which may cause more human workers to be employed, etc.). The higher projected yearly costs may in part be due to geographic locations of the facilities 320A and 320B in comparison to the other facilities. For example, the facilities 320A and 320B can be in a geographically warmer climate (which may require using more energy to perform the blast freezing operations as well as maintain the entire facility at predetermined temperature set points) and/or getting energy from higher-costing energy markets/utilities (which may cause the costs to increase, regardless of how long the energy is being used to perform blast freezing operations or other temperature maintenance operations). Various other factors may also result in the facilities 320A and 320B being projected to have higher yearly costs compared to other facilities that perform blast freezing operations.

In the graph 304, projected daily labor costs are illustrated for facilities 322A-N. As described above, one or more other graphs can be generated to visually depict one or more other types of projected costs that are determined by the computer system 102. The facilities 322A-N can satisfy the one or more comparison criteria and/or the one or more grouping criteria. For example, the facilities 322A-N may be in a same geographic region. The facilities 322A-N can receive pallets from same or similar customers. The facilities 322A-N can have same or similar types of operating equipment to complete tasks and operations (e.g., forklifts, autonomous vehicles, manual labor, human-operated machines). The facilities 322A-N can be used for shipping pallets to grocery stores or one or more other types of end-consumers/customers. The facilities 322A-N can perform similar or same operations (e.g., blast freezing operations). These are merely illustrative and non-limiting examples of characteristics that the facilities 322A-N may share with each other.

Still referring to the graph 304, some facilities, such as the facility 322B, can experience decreased labor costs at certain times of day. At those times of day, the facility may be leveraging lower energy costs and thus operate autonomous vehicles or other energy-intensive activities during those times of day instead of human labor. As another example, the facility 322B may have more human workers working during other times of day when energy costs are higher, energy supply is lower, more shipments or deliveries of pallets occur at the facility, etc. The graph 304 can provide various other insights about comparing and benchmarking facilities based on projected daily labor costs. The information shown in the graph 304 can be used by the facilities 322A-N to improve, adjust, and/or optimize their operations in such a way that reduces waste and leads to overall facility optimizations.

FIGS. 4A, 4B, 4C, and 4D are example GUI displays in a user-facing (e.g., customer-facing) dashboard for determining energy costs and an energy usage schedule for a storage facility. The GUIs of FIGS. 4A, 4B, 4C, and 4D can be presented at user devices of various users, including but not limited to customers of the storage facility, workers in the storage facility, and other relevant stakeholders associated with the storage facility.

Figure 4A:
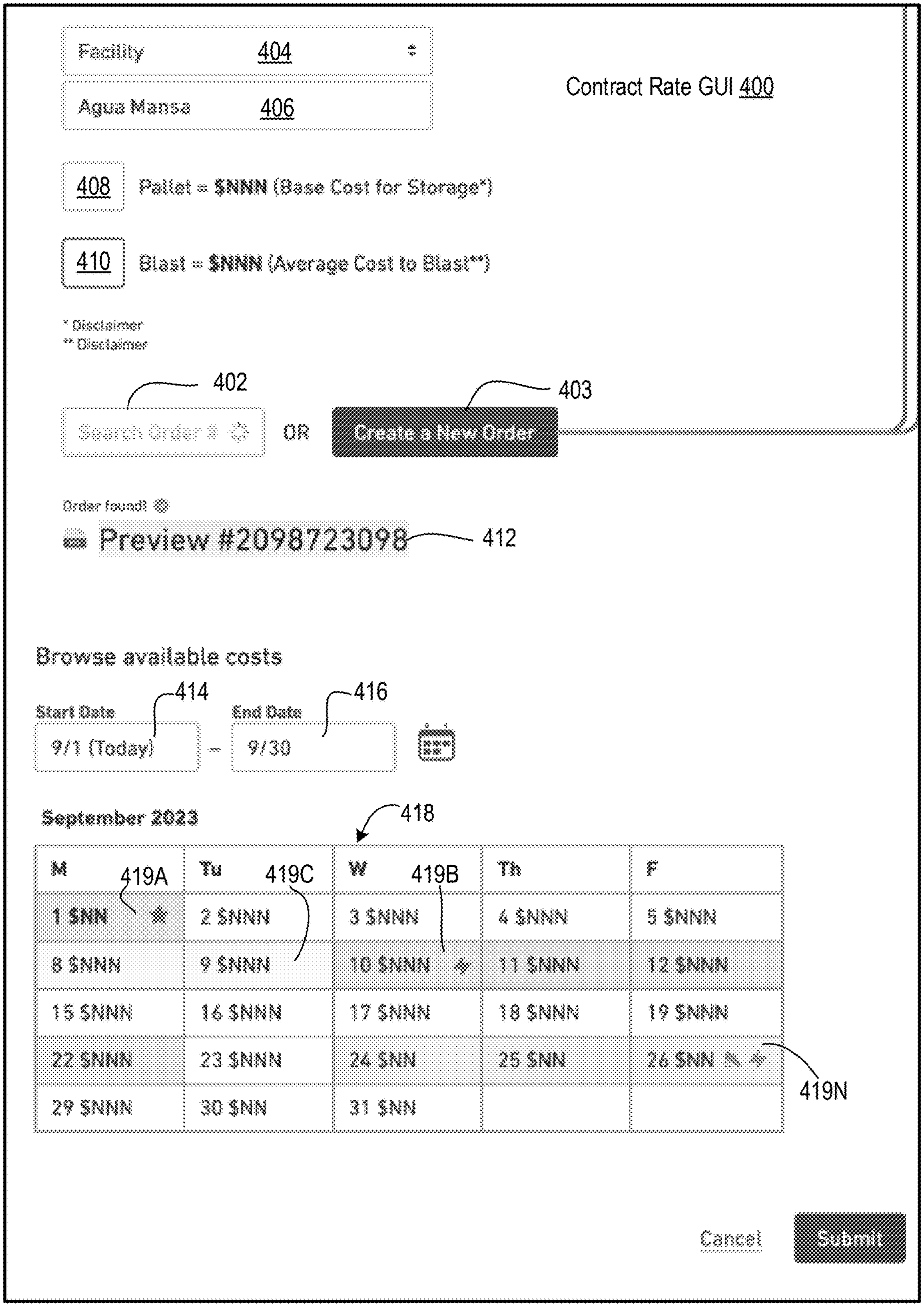
FIGS. 4A, 4B, 4C, and 4D are example GUI displays in a user-facing dashboard for determining and presenting pallet costs and energy usage for a storage facility.

FIG. 4A shows a contract rate GUI 400. The GUI 400 can be presented at a user device of a stakeholder of the storage facility, such as a sales team member of the storage facility. The GUI 400 can be used to identify and/or determine cost estimates related to a new customer order and/or an existing customer order for the storage facility. The GUI 400 can present selectable features for selecting a facility name, such as input field 404. The input field 404 can be a drop-down menu from which the user can select a facility. In some implementations, the input field 404 can be a textbox or other type of input field. Selection of the facility name in the input field 404 can cause a field 406 to be populated with the user-selected facility name, information, or identifier.

Selection of the facility name in the input field 404 can cause a base cost for storing pallets of items at the particular selected facility to be automatically populated in field 408. To populate the field 408, the user input provided at the field 404 can be transmitted to a computer system described herein (e.g., the computer system 102), which can query a database or other data repository for the base cost for storing pallets that is stored in association with the user-selected facility. The base cost can be determined by the computer system at another time using machine learning techniques described herein. In some implementations, the computer system may determine the base cost for storing the pallets at the user-selected facility in real-time. For example, the computer system can retrieve information associated with the user-selected facility from the database, such as costs that were logged for storing pallets at the facility over some predetermined period of time (e.g., a past day, a past week, a past month, a past 3 months, a past 6 months). The computer system can then provide the retrieved information as inputs to a machine learning model that was trained to determine and/or predict the base cost for storage over a predetermined period of time for the user-selected facility. The model output can be returned to the user device and presented in the field 408. Sometimes, the computer system can also retrieve other information to be used as inputs to the model, such as order information, scheduling tasks in the facility, storage space information in the facility, expected/upcoming orders.

Selecting the facility name from the input field 404 can cause the user device to populate a field 410 in the GUI 400 with an average cost to blast freeze a pallet in the selected facility. The average cost can be determined for any type of items or pallet of items that is blast frozen in the facility. The average cost can be determined for a particular type of item or pallet of items that is blast frozen in the facility, the particular type being associated with or otherwise similar to the type of items in the order that is being created or searched for in the GUI 400. The average cost to blast freeze can be predetermined by the computer system and retrieved from storage to be presented in the field 410 of the GUI 400, as described above in reference to the base cost for storage presented in the field 408. In some implementations, the average cost to blast freeze can be determined in real-time, using machine learning techniques similar to the techniques described above in reference to determining the base cost for storage.

Once the user selects the facility name in the input field 404, the user can search for an order using the input field 402. The input field 402 can be a search function and field. The user can begin typing in an order number into the input field 402. The order number can be associated with a particular group of pallets arriving or having already arrived at the particular facility for a particular customer (or for a group of customers, in some scenarios). The order number can be used to identify how many item SKUs are included in the order, what SKUs are included, how many pallets are included, temperature requirements for one or more items or pallets in the order, storage requirements for one or more items or pallets in the order, and other information about the items or pallets in the order. As the user types the order number into the input field 402, relevant order numbers can populate a dropdown menu of search results from the input field 402. The user can select the relevant order number of interest. Or, as the user keeps typing the order number into the input field 402, the search results may reduce in quantity until only one search result remains. In some implementations, the user can type in the entire order number but no search result may appear, which indicates that the particular order number does not exist in the facility's data repository, WMS, and/or other systems.

As the user types the order number into the field 402, each inputted value can be provided by the user device to the computer system, which can query or poll a data repository maintaining order information for the particular facility using the inputted value(s). The data repository can return results (e.g., a Boolean value) indicating whether the user input is associated with a particular order for the facility. The results can include a list of possible orders that contain the user-inputted values, which can be presented as the drop-down search results in the input field 402.

In some implementations, instead of providing the drop-down search results, the GUI 400 can present an indication of whether the order is found or not. If the order number is found (e.g., the order already exists), a selectable preview 412 of the order can be presented in the GUI 400. The user can select the preview 412 to view the order. The order preview can be presented in a pop-out window and/or may overlay at least a portion of the information presented in the GUI 400. The order preview can be presented in another GUI. Sometimes, the user may also select an option to download the order preview.

The order preview can present one or more information about the order that is stored in the data repository and described throughout this disclosure. For example, the computer system can retrieve contract details from one or more systems, such as the WMS, data repository, user devices of other stakeholders, and/or computing systems of other relevant parties/entities. The GUI 400 (or the preview of the identified order) can present a variety of information about the particular contract, including but not limited to order identification information and order details. The order identification information can indicate an order number, an order type (e.g., inbound, outbound), a facility associated with the order, a customer name/identifier. The order identification information can also indicate where the data in the contract details are retrieved from (e.g., a data store), an origin of the items or pallets in the order, and a destination of the items or pallets in the order. The order identification information can also include an estimated arrival date for the items or pallets in the order. The order details can include a listing of each item that is part of the order. The items can be presented in a table. The order details can include, for each item, an item identifier (ID), an item name, a lot ID, a group code, a hold code, a quantity, units of measurement (e.g., cases or pallets), and/or any additional notes about the particular item. The user can review this information and determine whether it is accurate. The user may select options to modify the information and/or confirm the information.

If, as the user provides input to the field 402 the computer system determines that no order already exists for the selected facility, an option 403 (e.g., button) can become selectable in the GUI 400. Sometimes, the option 403 may always be selectable, regardless of whether the user provides input to the field 402 or an order already exists. Selecting the option 403 can cause one or more GUIs shown in FIGS. 4B and 4C to be presented at the user device. For example, the GUI shown in FIG. 4B can be presented at the user device if the user is internal to or otherwise associated with the user-selected facility or a network of facilities that includes the user-selected facility. The GUI shown in FIG. 4C can be presented at the user device (or sent for presentation at another user device) if the user is a customer or otherwise external to the user-selected facility or network of facilities.

Once the order is identified using the user input provided in the field 402, the user can begin browsing available costs for storing pallets of items in that order in the selected facility. The user may provide input into data fields 414 and 416 to select a date range for viewing costs of accepting the identified order for storage at the selected facility. These costs can be presented in a grid 418. Each cell in the grid 418 can indicate a total estimated cost if the pallets of items associated with the identified order are dropped off that day and stored for the period of time that is provided by the user input in the data fields 414 and 416. The grid 418 can be used to compare estimated costs associated with the identified order to help the user determine a preferred timing for delivering the pallets of the order to the facility for storage.

The estimated costs presented in the grid 418 can be determined using machine learning and other techniques described herein. The estimated costs can reflect labor cost, energy cost, and/or other costs that may be calculated using a machine learning model, and thus reflect an overall estimated/approximate cost of storing the pallets of items for the particular order in the facility during the date range. The costs can be estimates, based on modeling, by the computer system described herein, historical data for the selected facility, the historical data being associated with the particular order, a particular customer associated with the order, a particular type of items and/or pallet of items, a particular time period, etc. Final costs (e.g., once the pallets of items for the order are accepted at the facility and put into storage) may differ, but should be within some expected or known threshold range from the estimated costs presented in the grid 418.

The estimated costs can be predetermined by the computer system and based on item type, time of the year, labor costs at the facility etc., as described herein. The estimated costs can be determined based on previous storage operations in the facility and/or similar facilities. The estimated costs can be determined based on current storage operations in the facility and/or similar facilities. Sometimes, the computer system described herein can identify types of items and/or dates associated with the order (which can be shown in the order preview), then use those types of items and dates to identify similar types of items and/or approximate similar dates for other orders that have been ingested at the particular facility. Information associated with the identified similar types of items and/or approximate similar dates can then be provided as input to a model that is trained to determine and output the estimated costs for the current order shown in the GUI 400. As an illustrative example, the computer system can identify where 'chicken feet' and 'chicken paws' may be handled the same way in the facility, even though the identified order may include 'chicken paws' but not 'chicken feet.' The computer system can determine the estimated cost for storing 'chicken paws' in the facility for the determined date range based on modeling historic data associated with storing 'chicken feet' in the facility (since the facility has not stored 'chicken paws' in the past). If, on the other hand, the order contains new types of items and the facility has not stored similar types of items, then the grid 418 may not be populated in the GUI 400. Additionally or alternatively, a notification can be presented at the user device (e.g., in the GUI 400) indicating that the estimated costs cannot be determined. That said, the computer system and other systems associated with the facility can be configured to continuously and/or routinely ingest information about different types of items in order to model cost estimates and other relevant information for the different types of items. As a result, a repository of item information can be maintained and used by the computer system to determine cost estimates for any type of item that may be stored in the selected facility and/or the network of facilities.

The grid 418 can be like a timetable, showing projected/estimated daily costs over a spread of days and over different durations (e.g., days). The user can select any of the cells in the grid 418 to choose a day for which to receive the pallets associated with the particular order and an amount of time to store those pallets. The user can make this decision based on the projected energy costs that are outputted and presented in the grid 418. Although the user can make a selection of the projected energy costs from the grid 418, the customer associated with the order may not be billed until the pallets of items for the order enter and then leaves the facility. After all, the energy costs shown in the grid 418 are merely estimates, and may fluctuate based on a variety of factors, including but not limited to unforeseen circumstances (e.g., unexpected weather conditions, traffic, labor shortage), order complexity, and/or accessorial changes. Accessorial changes may include but are not limited to any additional labor that may not be accounted for in standard labor classification for or in the facility or other facilities. As an illustrative example, accessorial changes may include customer specific labor that may be required to complete tasks that are unique to the customer's order(s).

Selecting one of the cells in the grid 418 can cause information associated with the selected cell to be transmitted to the computer system and/or other computing systems, WMSs, etc. associated with the facility. For example, the computer system can store the estimated energy cost for the selected cell in association with the order information in the data repository. The information associated with the selected cell can also be provided to a scheduling system for the facility. The scheduling system can use the provided information to determine when to schedule operations in the facility for receiving the pallets of items associated with the order and storing those pallets of item relative to storing other pallets for other orders that are coming into the facility.

One or more of the cells, such as the cells 419A-N, in the grid 418 can be represented with indicia. The indicia can include colors, patterns, highlighting, different formatting, and/or graphical elements. For example, one or more best options from an energy perspective (e.g., lowest cost) can be presented in a green cell and/or in a cell having a lightning bolt. One or more other indicia may also be used to highlight the cell having the best option or lowest energy cost.

As described herein, the grid 418 can provide estimated or projected energy costs over a date range determined by the user. The estimated energy costs shown in the grid 418 can vary based on a variety of conditions, including but not limited to weather, supply, demand, other inbound shipments, outbound shipments, labor availability, traffic, etc. In the illustrative example of FIG. 4A, Wednesday September 10$^{th}$, Thursday September 11$^{th}$, and Friday September 12$^{th}$ can have highest projected costs, regardless of requested storage duration for the order(s), because a storm may be expected to span over one or more of those days (which can cause delays) and/or fewer workers may be working in the particular facility due to a holiday (which can increase an amount of work performed by each available worker and/or warehouse vehicle and decrease overall efficiency of the facility). Optionally, one or more pallets in the order may also require blast freezing, thereby increasing the projected energy cost if the order is delivered on one of September $10^{th}$, $11^{th}$, or $12^{th}$ (as indicated with red-colored cells representing these days, such as cell 419B). On the other hand, projected energy costs can be lowest on Friday September $26^{th}$ (as indicated with a green-colored cell and lightning bolt, such as cell 419N), regardless of requested storage duration. This can be the case since most workers may be scheduled to work that date, weather conditions are expected to be good, and/or other orders will be removed from the facility by then. As a result, the facility may be projected to work efficiently on and/or around September $26^{th}$.

Tuesday September $9^{th}$ may be considered an expensive day for the order to be delivered to the facility because a large unload of pallets can be expected on that day. The large unload of pallets can be labor intensive, thereby using significant amounts of labor and/or warehouse vehicles at the facility. This can increase projected energy costs for September $9^{th}$ and/or for several days following September $9^{th}$. Additionally or alternatively, the large unload of pallets can have an internal temperature that exceeds some threshold temperature range for one or more locations in the facility (e.g., a storage location for the pallets). As a result, additional energy may be consumed at the facility in order to draw the warm air out of the one or more locations in the facility, thereby increasing projected pallet costs for the order(s) and/or other orders in the facility.

Figure 4B:
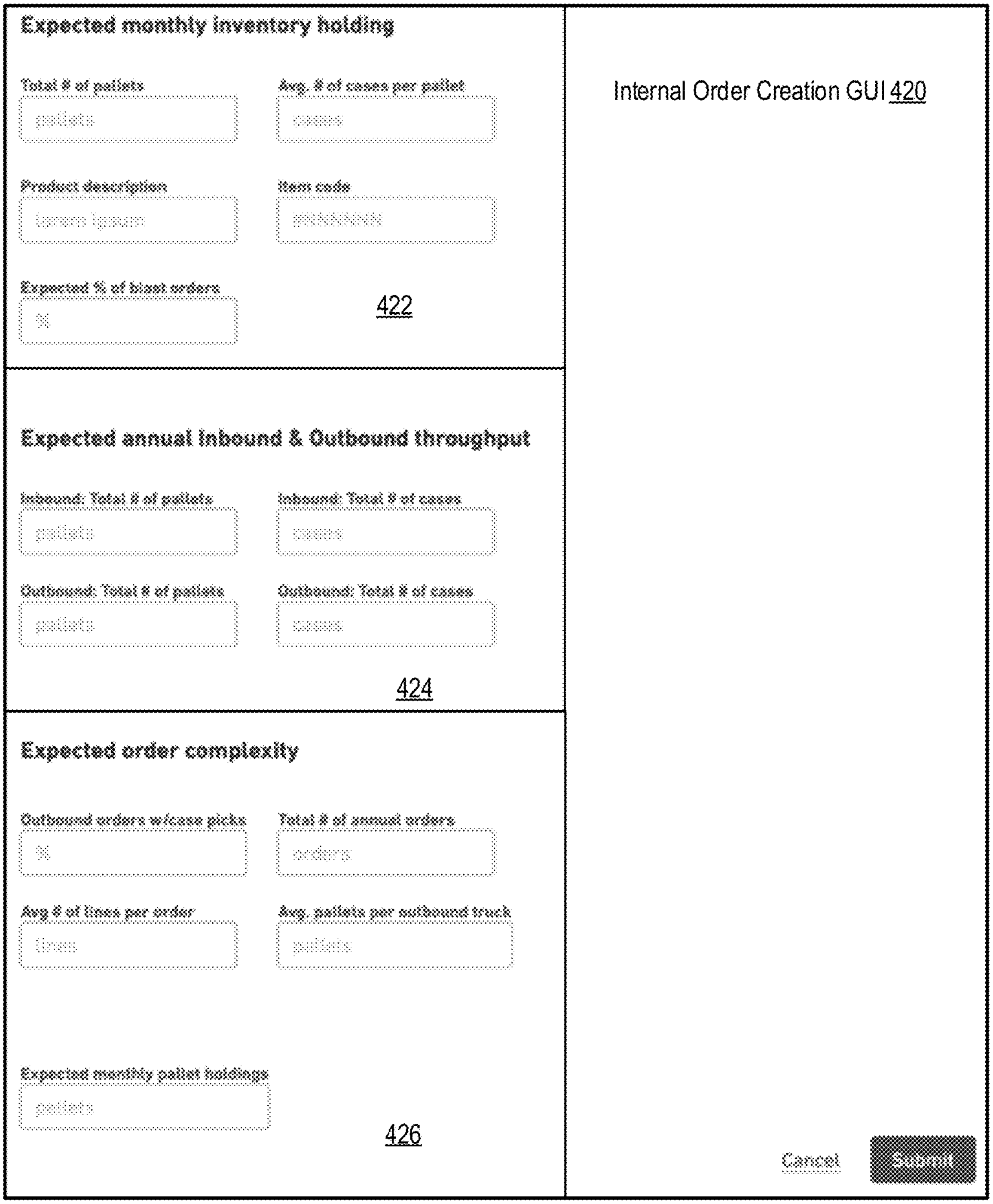

FIG. 4B illustrates an example GUI 420 for creating a new order from the perspective of a sales member or other relevant team members or user at the storage facility. The GUI 420 can be presented at the user device in response to the user selecting the option to create a new order in the GUI 400. Sometimes, the GUI 420 can be presented at the user device automatically, in response to the computer system determining that an order does not currently exist in response to user input in the GUI 400.

The GUI 420 includes sections 422, 424, and 426. Sometimes, all input fields in each of the sections 422, 424, and 426 may be required in order to create the new order. Sometimes, less than all the fields in the sections 422, 424, and 426 may be required to create the new order. Once the inputs are provided in the GUI 420, the inputs can be saved, a new order data object can be created and stored in a data repository that is accessible by the computer system described herein. The inputs saved in the order data object can be accessed and used by the computer system to estimate costs for storing and/or blast freezing the order. The inputs saved in the order data object can also be accessed and used by the computer system with machine learning models to generate and/or predict price quotes for a customer associated with the order or perform other processes and/or operations for the facility (e.g., scheduling tasks for receiving orders, packing orders, storing orders, etc.). In some implementations, as the user begins typing into one or more of the fields in the sections 422, 424, and 426, if that information is already known and/or associated with an order in the data repository, then the other fields in the sections 422, 424, and 426 can be automatically populated with relevant information associated with the order.

The section 422 can include one or more input fields to provide information about an expected monthly inventory holding for the order. The user can provide information such as a total quantity of pallets for monthly holding, an average quantity of cases per pallet for monthly holding, a product description, one or more item codes and/or other unique identifiers, and/or an expected percentage of blast orders during a month.

The section 424 can include one or more input fields to provide information about an expected annual inbound and outbound throughput for the order. The user can provide information such as an inbound total quantity of pallets, an inbound total quantity of cases, an outbound total quantity of pallets, and/or an outbound total quantity of cases.

The section 426 can include one or more input fields to provide information about an expected order complexity. The user can provide information such as a percentage of outbound orders with case picks, a total quantity of annual orders, an average quantity of lines per order, an average quantity of pallets per outbound truck, and/or an expected quantity of monthly pallet holdings.

The GUI 420 can include one or more additional or fewer sections for providing information to create a new order. The sections can include input fields relating to a particular new order for the customer. In some implementations, one or more of the sections may include input fields relating to all of the customer's orders or a subset of all of the customer's orders.

Figure 4C:
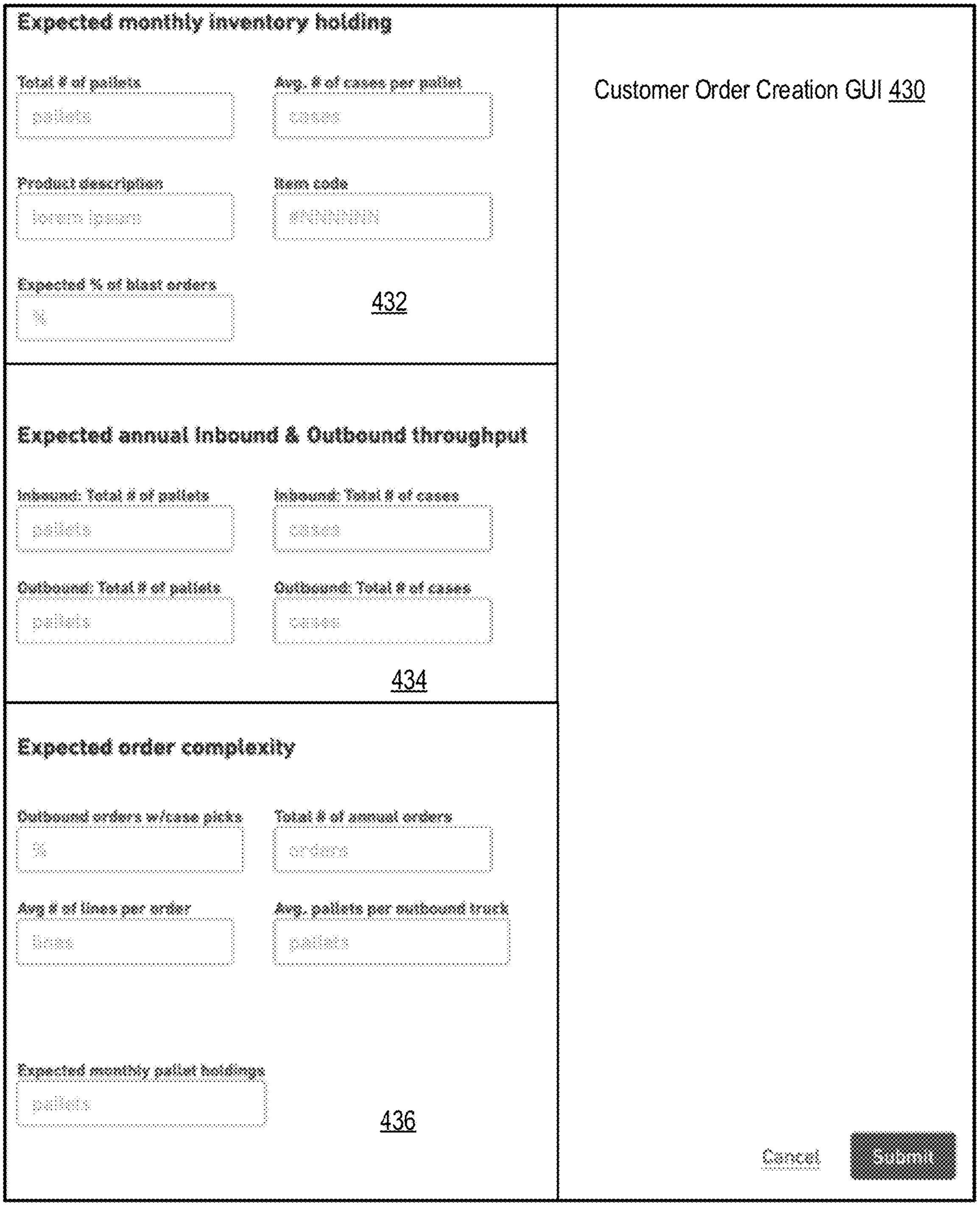

FIG. 4C illustrates an example GUI 430 for creating a new order from the perspective of a customer of the storage facility. The GUI 430 includes similar or the same fields as those described in reference to the GUI 420 in FIG. 4B. For example, the GUI 430 includes sections 432, 434, and 436, which are similar to the sections 422, 424, and 426 of the GUI 420. Refer to FIG. 4B for further discussion about the sections.

Figure 4D:
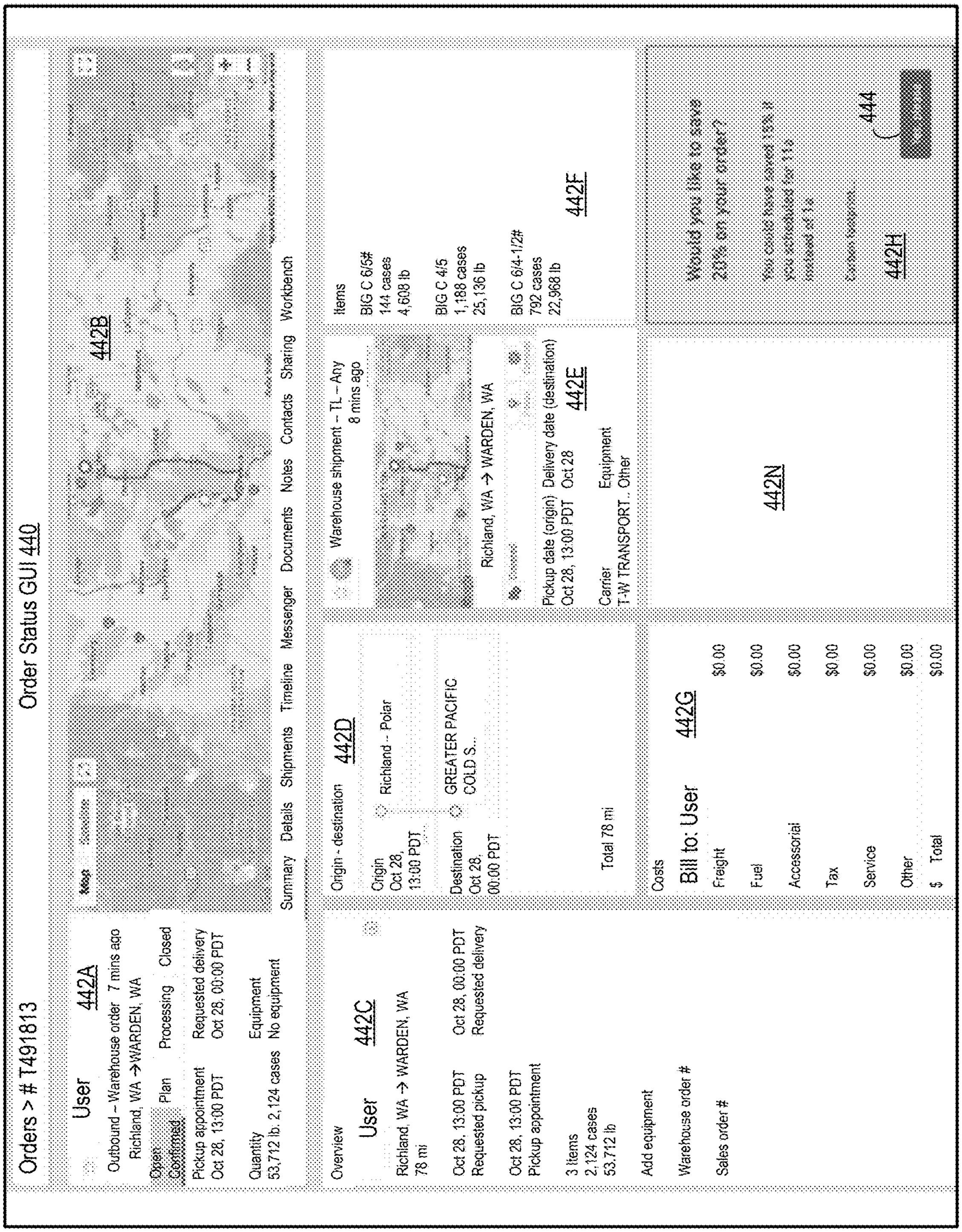

FIG. 4D illustrates an order status GUI 440. The GUI 440 can be presented to each customer of the facility. The customer can track one or more of their orders using interactive and selectable features and/or graphical elements presented in the GUI 440. Information about individual and/or groups of offers for the customer can be presented in modules 442A-N in the GUI 440.

Estimated costs for a particular order (e.g., based on dates, items in the order, etc.) can be presented in the module 442H. The estimated costs can be determined by the computer system using the disclosed techniques. The estimated costs can be similar to or the same as the estimated costs shown in the grid 418 of the GUI 400 in FIG. 4A. The estimated costs presented in the module 442H can be the user-selected estimated cost from the grid 418 of the GUI 400. The module 442H can include a selectable option 444 to view one or more other estimated costs that can result in the customer saving on costs and/or reducing their carbon footprint. The module 442H can present information about how much or a percentage of costs that the customer can save by adjusting the schedule for their order. User interaction with the module 442H can allow for adjusting the scheduling of the customer's order to ensure cost savings and/or reduced carbon footprint.

The modules 442A-N can present one or more additional or other widgets and/or information. For example, a summary of a particular order status can be presented in the module 442A. A map of a journey for the particular order can be presented in the module 442B. An overview of order information can be presented in the module 442C. Information about an origin and destination for the order can be presented in the module 442D. Additional details about the journey for the order can be presented in the module 442E. Information about items included in the order can be presented in the module 442F. Information about costs being billed and/or to-be-billed to the customer can be presented in the module 442G. Additional or other information related to the order can be presented in the module 442N.

FIG. 5 is an example system diagram of components that can be used to perform one or more of the techniques described herein, such as homogenizing data. System 500 is merely illustrative. One or more other systems of devices, components, and/or computing devices can be used to perform the techniques described herein.

In the illustrative system 500, an ODS data store 502, WMS 504, WMS simplified data store 506, WCS data store 508, devices 510A-N, a data structure 514, and database 516 can be in communication with each other over one or more networks (e.g., the network 106 described in reference to FIG. 1A). As described throughout, data can be retrieved from and/or provided by many different systems, where the data can be represented in different formats and/or file types. For example, data can be received from the components 502, 504, 506, 508, and 510A-N. The data can be standardized using the process 600 described in FIG. 6. The standardized data can be maintained as the data structure 514. Optimization rules and/or algorithms 512A-N can be used to standardize the data in the data structure 514 such that the data is structured and standardized the same/similarly across different WMSs. Any of the data collects and/or generated by the components 502, 504, 506, 508, and/or 510A-N can be stored in the database 516. Any of the data structure 514 can also be stored in the database 516. The database 516 can store, as some illustrative examples, any data collected by new devices or other devices in a storage facility (e.g., pallet profiling information, pallet movement data), data from one or more WMSs (e.g., inventory data), etc.

In brief, the ODS data store 502 can be similar to the database 516 and can store any variety of information that is used and/or processed by the WMS 504.

The WMS 504 can maintain data that tracks truck arrivals, truck departures, orders, pallet movements, and storage locations. The WMS 504 can also maintain other data described throughout this disclosure. For example, the WMS 504 can store and/or collect/retrieve energy usage data and/or refrigeration control system data, such as temperature set points, solenoid states, blast states, etc. Refer to FIG. 1A for further discussion about different types of data that may be collected at the WMS 504.

The WMS simplified data store 506 can be a simplified version of the WMS 504 and may maintain data such as inventor information. Pallet movement and/or decision making information can also be stored in the data store 506. The WCS (warehouse control system) data store 508 can maintain information about the facility, such as an automated warehouse and controls that are executed within the facility to operate components therein (e.g., autonomous vehicles, forklifts, conveyor belts, autonomous guided vehicles, etc.). The devices 510A-N can collect raw data in each of the facilities, which may include sensor data. The sensor data can include but is not limited to temperature data, humidity data, pressure data, movement data, image data, video data, motion data, and other types of data.

The optimization algorithms 512A-N may include rules and/or algorithms that can be used to optimize decision making in the facility. The algorithms 512A-N can call data from any of the components described above, such as through an API data structure, which can be organized and standardized across facilities. Data structure 514 for the particular facility may also be applied to any of the data that is collected, received, and/or processes as described herein. By applying the structure 514 to the data, the data can be structured/similar format and thus standardized across the systems of the facility.

FIG. 6 is a flowchart of a process 600 for homogenizing data from different sources to be used in the disclosed techniques. The process 600 can be performed to translate data across time series to a standardized format so that the data can be further processed to make accurate and robust determinations (e.g., determining current energy costs, determining energy costs over past periods of time, projecting energy costs for future periods of time). The process 600 can be performed by the computer system 102 described herein. The process 600 can also be components by one or more of the components in the system 500 of FIG. 5. For illustrative purposes, the process 600 is described from the perspective of a computer system.

Referring to the process 600, the computer system can receive time series data from a plurality of sources, including localization data in block 602. Refer to FIG. 1A for further discussion about the time series data. The localization data can include a map between location names in the facility, such as pallet locations, rooms, zones, and/or blast freezers/cells. The localization data can be provided by a WMS. The localization data typically may not be stored in a centralized database. Rather, the localization data can be stored locally at devices of relevant stakeholders in the facility, such as a general manager. Similarly, data about refrigeration system assets may be stored in random devices and/or local files on devices of the relevant stakeholders, rather than in some standardized format in a data store or other system associated with the facility. Because the data can be stored in various devices and/or local folders, the data may also be stored as different types of data and/or formats.

In block 604, the computer system can standardize the data across the plurality of sources. Standardizing the data can include generating a standard set of data fields, with standardized labels across all facilities (or a single facility) or a quantity of facilities. As an illustrative example, pallet history tables from WMS data can be formatted the same way, regardless of the WMS system from which those tables are derived. The same can apply to refrigeration control system data, regardless of the refrigeration control system data type and/or original formatting. Other standardization examples are also possible. Standardizing the data is beneficial in order to scale calculations, analysis, and/or optimization routines from one facility to the next facility or within a particular facility.

The computer system can map the standardized data between the sources using the localization data (block 606). The localization data can be collected and standardized and mapped between systems (e.g., WMS locations and blast cells, energy used by assets in a particular room in the facility). The mapping of localization data can also be beneficial to further build data structures and simplify how data is referenced and connected between different parts of a system associated with each facility or a group of facilities. Therefore, the mapped, standardized data can be used to further standardize and simplify processes in accessing data and/or joining data between systems to generate robust and accurate determinations.

The computer system can optionally define data structures to reference and connect the mapped data across the sources (block 608). Finally, the computer system can then return the mapped data for further processing (block 610). Returning the data can include storing the data in a data store. The data can then be retrieved by the computer system and used to make determinations to optimize efficiency in the warehouse. For example, the data can be used to determine energy costs per pallet over one or more past periods of time. The data can also be used to project energy costs per pallet over one or more future periods of time.

Figure 7:
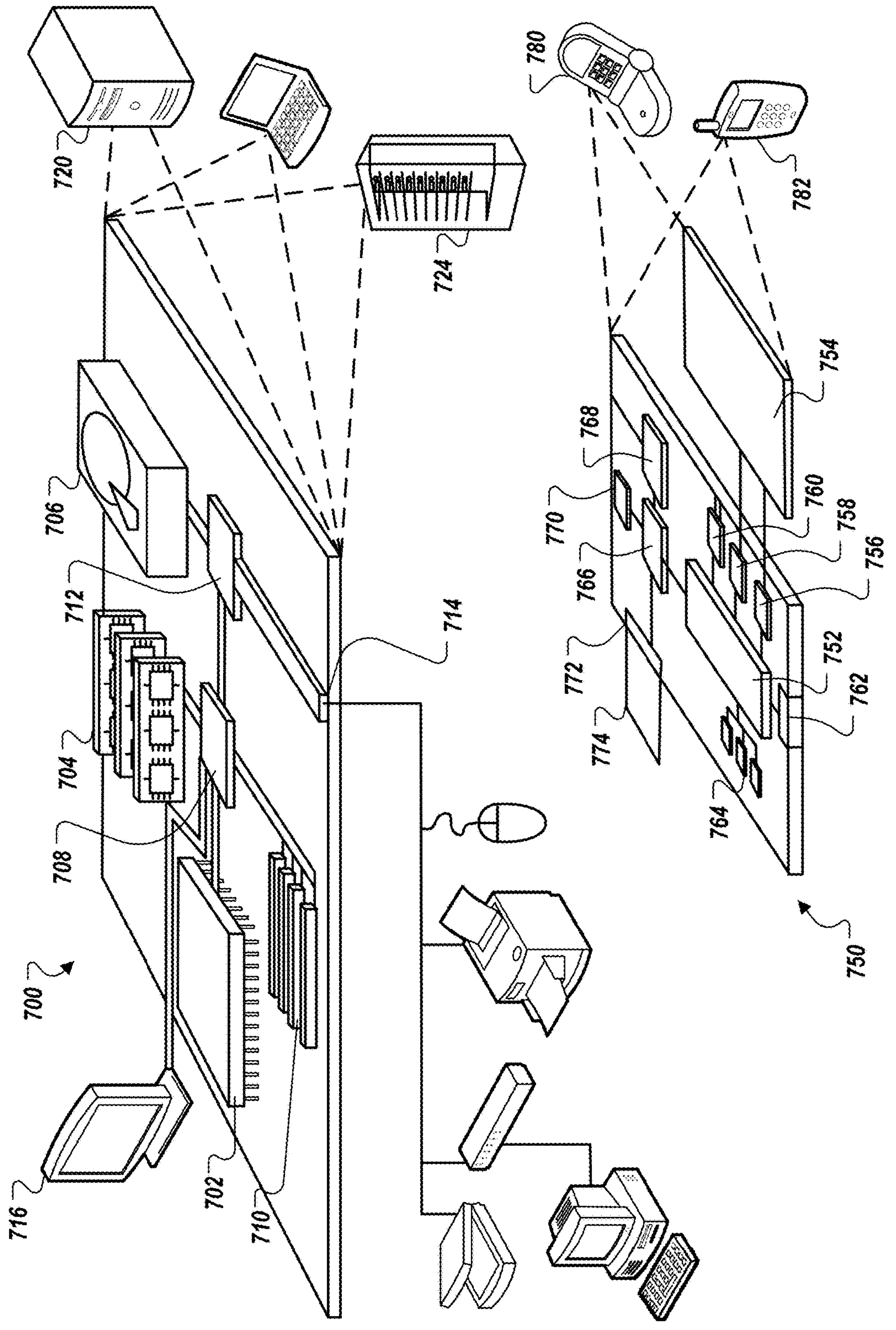
FIG. 7 is a schematic diagram that shows an example of a computing device and a mobile computing device.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, components from the computing device 700 can be combined with other components in a mobile device (not shown), such as a mobile computing device 750. Each of such devices can contain one or more of the computing device 700 and the mobile computing device 750, and an entire system can be made up of multiple computing devices communicating with each other.

The mobile computing device 750 includes a processor 752, a memory 764, an input/output device such as a display 754, a communication interface 766, and a transceiver 768, among other components. The mobile computing device 750 can also be provided with a storage device, such as a micro-drive or other device, to provide additional storage. Each of the processor 752, the memory 764, the display 754, the communication interface 766, and the transceiver 768, are interconnected using various buses, and several of the components can be mounted on a common motherboard or in other manners as appropriate.

The processor 752 can execute instructions within the mobile computing device 750, including instructions stored in the memory 764. The processor 752 can be implemented as a chipset of chips that include separate and multiple analog and digital processors. The processor 752 can provide, for example, for coordination of the other components of the mobile computing device 750, such as control of user interfaces, applications run by the mobile computing device 750, and wireless communication by the mobile computing device 750.

The processor 752 can communicate with a user through a control interface 758 and a display interface 756 coupled to the display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can provide communication with the processor 752, so as to enable near area communication of the mobile computing device 750 with other devices. The external interface 762 can provide, for example, for wired communication in some implementations, or for wireless communication in other implementations, and multiple interfaces can also be used.

The memory 764 stores information within the mobile computing device 750. The memory 764 can be implemented as one or more of a computer-readable medium or media, a volatile memory unit or units, or a non-volatile memory unit or units. An expansion memory 774 can also be provided and connected to the mobile computing device 750 through an expansion interface 772, which can include, for example, a SIMM (Single In Line Memory Module) card interface. The expansion memory 774 can provide extra storage space for the mobile computing device 750, or can also store applications or other information for the mobile computing device 750. Specifically, the expansion memory 774 can include instructions to carry out or supplement the processes described above, and can include secure information also. Thus, for example, the expansion memory 774 can be provide as a security module for the mobile computing device 750, and can be programmed with instructions that permit secure use of the mobile computing device 750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 can communicate wirelessly through the communication interface 766, which can include digital signal processing circuitry where necessary. The communication interface 766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 768 using a radio-frequency. In addition, short-range communication can occur, such as using a Bluetooth, WiFi, or other such transceiver (not shown). In addition, a GPS (Global Positioning System) receiver module 770 can provide additional navigation- and location-related wireless data to the mobile computing device 750, which can be used as appropriate by applications running on the mobile computing device 750.

The mobile computing device 750 can also communicate audibly using an audio codec 760, which can receive spoken information from a user and convert it to usable digital information. The audio codec 760 can likewise generate audible sound for a user, such as through a speaker, e.g., in a handset of the mobile computing device 750. Such sound can include sound from voice telephone calls, can include recorded sound (e.g., voice messages, music files, etc.) and can also include sound generated by applications operating on the mobile computing device 750.

The mobile computing device 750 can be implemented in a number of different forms, as shown in the figure. For example, it can be implemented as a cellular telephone 780. It can also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for modeling costs per pallet in a facility, the system comprising:
- a cold room comprising a fan and a sensor;
- a refrigeration control system (RCS) configured to:
  - receive from the sensor a sensor measurement associated with the cold room, and
  - automatically control the fan associated with the cold room; and
- a computer system in network communication with the RCS, wherein the computer system comprises one or more processors and memory storing instructions that, when executed, cause the one or more processors to perform operations comprising:
  - receiving, from at least one of a warehouse management system (WMS) or the RCS, time series data for a period of time for pallets in the facility;
  - retrieving, from a data store, pallet movement data, changes in temperature data, labor usage data, and energy consumption data for each pallet amongst the pallets;
  - determining a plurality of costs per pallet over the period of time based on correlating the time series data with the retrieved data for each pallet amongst the pallets, wherein the plurality of costs per pallet comprises at least one of energy costs per pallet or labor costs per pallet;
  - determining a plurality of projected costs per pallet based on modeling the plurality of costs per pallet over the period of time, wherein the plurality of projected costs per pallet are determined for one or more future periods of time;
  - generating, based on the plurality of projected costs per pallet, instructions for execution by the RCS to automatically control the fan associated with the cold room at a particular time that corresponds to a lowest energy cost amongst a plurality of energy costs associated with the plurality of projected costs per pallet; and
  - returning, to the RCS, the instructions for execution,
- wherein the RCS is configured to execute the instructions to automatically control the fan associated with the cold room at the particular time that corresponds to the lowest energy cost, wherein automatically controlling the fan associated with the cold room comprises automatically activating the fan until the sensor measurement is within a predetermined threshold range.

2. The system of claim 1, wherein the computer system is further configured to:
- identify a plurality of facilities that satisfy one or more grouping criteria;
- retrieve, from the data store, projected costs per pallet for each of the identified plurality of facilities;
- generate a comparison of the retrieved projected costs per pallet for the plurality of facilities; and
- return the comparison for presentation at a user device, wherein the comparison comprises a visual depiction for benchmarking the plurality of facilities based on their respective projected costs per pallet.

3. The system of claim 1, wherein:
- the time series data includes first temperature data for a dock area in the facility indicating a temperature of the dock area before a set of pallets arrived at the dock area and second temperature data for the dock area indicating a temperature of the dock area after the set of pallets arrived, and
- the computer system is further configured to:
  - determine a change in temperature for the dock area based on the first and second temperature data;
  - determine an energy cost for the set of pallets based on the change in temperature for the dock area, wherein the energy cost for the set of pallets indicates a quantitative metric of an amount of energy resources used to adjust a temperature for the dock area from (i) the temperature after the set of pallets arrived to (ii) the temperature before the set of pallets arrived; and
  - apportion the energy cost to each pallet in the set of pallets based on one or more apportionment criteria.

4. The system of claim 3, wherein the one or more apportionment criteria is based on at least one of a size of the pallet, a weight of the pallet, an internal temperature of the pallet, a required storage temperature for the pallet, or a type of items on the pallet.

5. The system of claim 3, wherein the computer system is further configured to:
- determine a labor cost associated with transporting the pallets in the set of pallets; and
- apportion the labor cost to each pallet in the set of pallets based on the one or more apportionment criteria.

6. The system of claim 5, wherein the computer system is further configured to determine, for one or more future periods of time, the plurality of projected costs per pallet in the set of pallets based on the apportioned energy cost and the apportioned labor cost.

7. The system of claim 1, wherein the time series data comprises at least one of: truck arrival data for the period of time, truck departure data for the period of time, storage location data for the period of time, customer order data for the period of time, pallet data for the period of time, labor availability data for the period of time, facility resources availability data for the period of time, or energy usage data for the period of time.

8. The system of claim 1, wherein the time series data comprises at least one of: facility temperature data for the period of time, temperature set point data for the period of time, solenoid state data for the period of time, or blast cell state data for the period of time.

9. The system of claim 1, wherein the plurality of projected costs per pallet for the one or more future periods of time are presented in a timetable in a graphical user interface (GUI) display at a user device, wherein each box in the timetable corresponds to one of the plurality of projected costs per pallet for one of the future periods of time and further based on one of a plurality of storage durations.

10. The system of claim 1, wherein the computer system is further configured to:

determine, based on the plurality of projected costs per pallet, a profit margin for the facility over the period of time; and return the profit margin for the facility for presentation at a user device.

11. The system of claim 1, wherein the computer system is further configured to:

determine, based on the plurality of projected costs per pallet, facility waste information for the facility over the period of time, wherein the facility waste information comprises at least one of labor costs or energy costs; and return the facility waste information for presentation at a user device.

12. The system of claim 1, wherein the computer system is further configured to:

determine, based on the plurality of projected costs per pallet, pallet pricing schedules for the facility over the period of time; and return at least a portion of the pallet pricing schedules for the facility for presentation at a user device.

13. A method for modeling costs per pallet in a facility, the method comprising:

receiving, by a computer system and from at least one of a warehouse management system (WMS) or a refrigeration control system (RCS), time series data for a period of time for pallets in a facility, wherein the refrigeration control system (RCS) is configured to:

receive, from a sensor, a sensor measurement associated with the cold room, and automatically control a fan associated with the cold room;

retrieving, by the computer system and from a data store, pallet movement data, changes in temperature data, labor usage data, and energy consumption data for each pallet amongst the pallets;

determining, by the computer system, a plurality of costs per pallet over the period of time based on correlating the time series data with the retrieved data for each pallet amongst the pallets, wherein the plurality of costs per pallet comprises at least one of energy costs per pallet or labor costs per pallet;

determining, by the computer system, a plurality of projected costs per pallet based on modeling the plurality of costs per pallet over the period of time, wherein the plurality of projected costs per pallet are determined for one or more future periods of time;

generating, by the computer system and based on the plurality of projected costs per pallet, instructions for execution by the RCS to automatically control the fan associated with the cold room at a particular time that corresponds to a lowest energy cost amongst a plurality of energy costs associated with the plurality of projected costs per pallet; and returning, by the computer system to the RCS, the instructions for execution, wherein the RCS is configured to execute the instructions to automatically control the fan associated with the cold room at the particular time that corresponds to the lowest energy cost, wherein automatically controlling the fan associated with the cold room comprises automatically activating the fan until the sensor measurement is within a predetermined threshold range.

14. The method of claim 13, further comprising:

determining, by the computer system and based on the plurality of projected costs per pallet, pallet pricing schedules for the facility over the period of time; and returning, by the computer system, at least a portion of the pallet pricing schedules for the facility for presentation at a user device.

15. The method of claim 13, further comprising:

identifying, by the computer system, a plurality of facilities that satisfy one or more grouping criteria;

retrieving, by the computer system and from the data store, projected costs per pallet for each of the identified plurality of facilities;

generating, by the computer system, a comparison of the retrieved projected costs per pallet for the plurality of facilities; and returning, by the computer system, the comparison for presentation at a user device, wherein the comparison comprises a visual depiction for benchmarking the plurality of facilities based on their respective projected costs per pallet.

16. The method of claim 13, wherein:

the time series data includes first temperature data for a dock area in the facility indicating a temperature of the dock area before a set of pallets arrived at the dock area and second temperature data for the dock area indicating a temperature of the dock area after the set of pallets arrived.

17. The method of claim 16, further comprising:

determining, by the computer system, a change in temperature for the dock area based on the first and second temperature data;

determining, by the computer system, an energy cost for the set of pallets based on the change in temperature for the dock area, wherein the energy cost for the set of pallets indicates a quantitative metric of an amount of energy resources used to adjust a temperature for the dock area from (i) the temperature after the set of pallets arrived to (ii) the temperature before the set of pallets arrived; and apportioning, by the computer system, the energy cost to each pallet in the set of pallets based on one or more apportionment criteria.

18. The method of claim 17, further comprising:

determining, by the computer system, a labor cost associated with transporting the pallets in the set of pallets; and apportioning, by the computer system, the labor cost to each pallet in the set of pallets based on the one or more apportionment criteria.

* * * * *